United States Patent [19]

Takaike

[11] Patent Number: 6,002,862

[45] Date of Patent: *Dec. 14, 1999

[54] MAN-MACHINE INTERFACE SYSTEM ALLOWING INPUT OF INFORMATION BY OPERATOR INTO NON-INPUT-FOCUSED CONTROL AMONG MORE THAN ONE CONTROLS ON DISPLAY SCREEN WITH MINIMUM KEY OPERATION

[75] Inventor: Shinichi Takaike, Inagi, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/540,625

[22] Filed: Oct. 6, 1995

[30] Foreign Application Priority Data

Oct. 28, 1994 [JP] Japan .................................. 6-264830

[51] Int. Cl.⁶ ...................................................... G06F 9/44
[52] U.S. Cl. ........................................ 395/500.38; 345/146
[58] Field of Search ................................. 395/339, 500, 395/500.38; 345/346, 326, 356, 129, 500, 146, 26; 341/26; 382/187

[56] References Cited

U.S. PATENT DOCUMENTS

| | | | |
|---|---|---|---|
| 4,202,041 | 5/1980 | Kaplow et al. | 341/26 |
| 5,226,117 | 7/1993 | Miklos | 395/356 |
| 5,241,624 | 8/1993 | Torres | 395/129 |
| 5,537,618 | 7/1996 | Boulton et al. | 345/26 |
| 5,544,299 | 8/1996 | Wenstrand et al. | 395/339 |
| 5,566,248 | 10/1996 | Ulrich | 382/187 |
| 5,586,243 | 12/1996 | Barber et al. | 395/326 |

FOREIGN PATENT DOCUMENTS

| | | |
|---|---|---|
| 56-038673 | 4/1981 | Japan . |
| 60-132227 | 7/1985 | Japan . |
| 60-179826 | 9/1985 | Japan . |
| 61-175852 | 8/1986 | Japan . |
| 62-114022 | 5/1987 | Japan . |
| 62-293413 | 12/1987 | Japan . |
| 63-068922 | 3/1988 | Japan . |
| 63-187362 | 8/1988 | Japan . |
| 1-042764 | 2/1989 | Japan . |
| P1-216465 | 8/1989 | Japan . |
| 1-282624 | 11/1989 | Japan . |
| P1-280863 | 11/1989 | Japan . |
| 2-204787 | 8/1990 | Japan . |
| P2-288959 | 11/1990 | Japan . |
| P3-15891 | 1/1991 | Japan . |
| 3-156566 | 7/1991 | Japan . |
| P3-182924 | 8/1991 | Japan . |
| P4-287158 | 10/1992 | Japan . |
| P5-135006 | 6/1993 | Japan . |
| 5-197716 | 8/1993 | Japan . |
| 5-241730 | 9/1993 | Japan . |
| 5-242078 | 9/1993 | Japan . |
| 6-083540 | 3/1994 | Japan . |

OTHER PUBLICATIONS

*Microsoft Announced New Version of "Microsoft Office" and New Products with "Microsoft Home" Brand*, ASCII, vol. 18, #9, Sep. 1994, p. 186. (With partial translation).

*User's Guide for Microsoft® Word Version 6.0*, Published by Microsoft Corporation, Jul. 15, 1994, pp. 107–108. (With partial translation).

*Primary Examiner*—Kevin J. Teska
*Assistant Examiner*—Dan Fiul
*Attorney, Agent, or Firm*—Staas & Halsey LLP

[57] ABSTRACT

A process and an apparatus which allows, while an input focus is located in a first input area on a display screen, an input of information through a second input area on the display screen. First, it is determined whether or not there is a key input from a keyboard, where the key input is predefined for inputting information through the second input area, and is not predefined for inputting information through the first input area, while the input focus is located in the first input area. When it is determined that there is the above key input, the information designated by the key input, is input through the second input area, while maintaining the location of the input focus in the first input area.

38 Claims, 11 Drawing Sheets

Fig. 8B
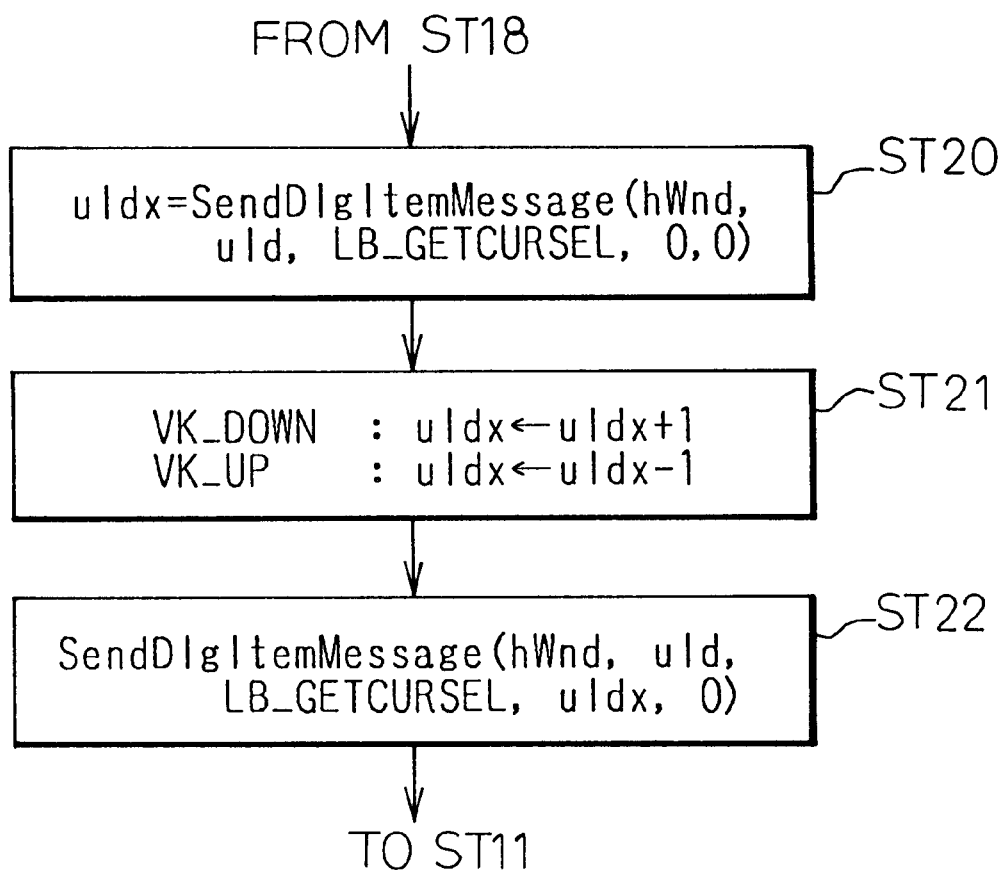
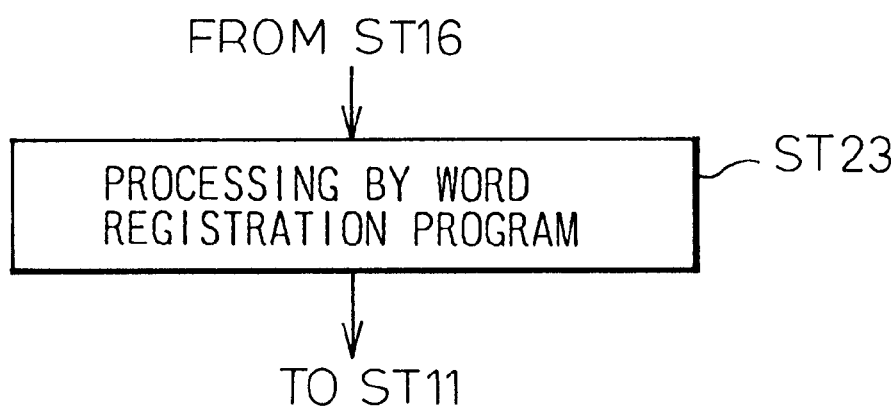

Fig.10

| INPUT OF SYMBOL |
|---|

TYPE OF SYMBOL(← →) ─────────── 71

○ GENERAL     ○ DESCRITION     ○ ACADEMIC
⦿ UNIT     ○ PARENTHESES     ○ RULED LINE
○ GREEK          ○ RUSSIAN

SYMBOL (↑ ↓)

¥
$
¢
£
%
°C
...

72

[ INPUT ]  [ CANCEL ]

MAN-MACHINE INTERFACE SYSTEM ALLOWING INPUT OF INFORMATION BY OPERATOR INTO NON-INPUT-FOCUSED CONTROL AMONG MORE THAN ONE CONTROLS ON DISPLAY SCREEN WITH MINIMUM KEY OPERATION

BACKGROUND OF THE INVENTION

1. Field of the Invention

The present invention relates to process and apparatus, to be used in or as a portion of a man-machine interface system, for allowing or assisting an operator to input information into an input area among a plurality of input areas, respectively provided for a plurality of information items, in a display screen. A typical example of such an input area is a "control", which is defined by Microsoft Corporation, for example, in "Windows 95 Software Development Kit For Far East, α version". Namely, the "control" may be a child window in a dialog box or another window, and the child window may be an "edit control (text box)", into which a text (sequence of characters, numbers, and/or symbols) can be inserted; or a "list box" or a group of "option buttons", or a group of "check boxes", where in each of the "list box", a group of "option buttons", and a group of "check boxes" a plurality of optional items are listed for an operator to select one among the plurality of optional items. The process according to the present invention comprises a series of specific operational steps to be performed on or with the aid of a computer, and the apparatus according to the present invention is a computer or other programmable apparatus whose actions are directed by a computer program or other form of software (for example, hardware logic circuitry). The present invention also relates to a computer-readable memory (or computer-readable data storage medium) which stores a program such that a computer used with the computer-readable memory executes the above process according to the present invention, and functions as the above apparatus according to the present invention. Although all of the explanations in this specification are provided for the Windows system, it will be apparent that all of the matters explained in this specification based on the Windows system, can be easily applied to another graphic user interface (GUI) system, for example, used in the Macintosh system, the UNIX system, the OS/2 system, and the like.

2. Description of the Related Art

In the Windows system, when a dialog box contains a plurality of controls such as edit controls and/or list boxes, an input focus is given to one of the controls (in other words, one of the controls is designated as a control which can receive information input from an operator) by clicking an area of the control by a mouse, or pressing a TAB key on a keyboard, where the location of the input focus cyclically moves from one control to another when the TAB key is pressed. Namely, in the conventional Windows system, when an operator wishes to change the location of the input focus, an operator must repeatedly press the TAB key until the location of the input focus reaches the control into which the operator wishes to input information, after the cyclical moving of the input focus, or the operator must move his or her hand away from the keyboard to find, move and click a mouse, and move the hand back to the keyboard for keyboard operations following the mouse operation for changing the location of the input focus.

Therefore, according to the conventional Windows system, the operators are bothered with troublesome operations to change the location of the input focus in a dialog box or in a window.

SUMMARY OF THE INVENTION

An object of the present invention is to provide process and apparatus for allowing or assisting an operator to input information into an area among a plurality of areas, respectively provided for a plurality of information items, in a display screen, wherein the amount of operator's work for inputting information through the controls is reduced.

According to the first aspect of the present invention, there is provided a process for allowing, while an input focus is located in a first input area on a display screen, an input of information through a second input area on the display screen. The process contains the steps of: (a) determining, while the input focus is located in the first input area, whether or not there is a key input from a keyboard, where the key input is predefined for inputting information through the second input area, and is not predefined for inputting information through the first input area; and (b) inputting, while maintaining the location of the input focus in the first input area, the information designated by the key input, through the second input area, when it is determined in step (a) that there is a key input.

(1-1) In the process according to the first aspect of the present invention, the key input can include the simultaneous pressing of more than one key on the keyboard.

According to the second aspect of the present invention, there is provided a process for allowing, while an input focus is located in a first input area on a display screen, an input of information through one of second and third input areas on the display screen. The process contain the steps of: (a) determining, while the input focus is located in the first input area, whether or not there is a first key input from a keyboard, where the first key input is predefined for inputting information through either of the second and third input areas, and is not predefined for inputting information through the first input area; (b) determining whether or not there is a second key input which is predefined to designate the second input area; (c) inputting, while maintaining the location of the input focus in the first input area, the information designated by the first key input, through the second input area, when it is determined in steps (a) and (b) that there are the first and second key inputs, respectively; and (d) inputting, while maintaining the location of the input focus in the first input area, the information designated by the first key input, through the third input area, when it is determined in step (a) that there is a first key input and it is determined in step (b) that there is no second key input.

(2-1) In the process according to the second aspect of the present invention, each of the first and second key inputs can include simultaneous pressing of more than one key on the keyboard.

According to the third aspect of the present invention, there is provided a process for allowing, while an input focus is located in a first input area on a display screen, an input of information through one of a plurality of second input areas on the display screen. The process contains the steps of: (a) determining, while the input focus is located in the first input area, whether or not there is a first key input from a keyboard, where the first key input is predefined for inputting information through any of the plurality of second input areas, and is not predefined for inputting information through the first input area; (b) receiving one of a plurality of predefined second key inputs designating the plurality of second input areas, respectively, and determining which one of the plurality second input areas the above one of the plurality of second key inputs designates; and (c) inputting, while maintaining the location of the input focus in the first input area, the information designated by the first key input, through the above one of the plurality of second input areas which is determined in step (b) when it is determined in step (a) that there is the first key input, and the above one of the plurality of second input areas which the above one of the plurality of predefined second key inputs designates is determined in step (b).

(3-1) In the process according to the third aspect of the present invention, each of the first and second key inputs can include simultaneous pressing of more than one key on the keyboard.

According to the fourth aspect of the present invention, there is provided an apparatus for allowing, while an input focus is located in a first input area on a display screen, an input of information through a second input area on the display screen. The apparatus contains: a determining unit for determining, while the input focus is located in the first input area, whether or not there is a key input from a keyboard, where the key input is predefined for inputting information through the second input area, and is not predefined for inputting information through the first input area; and an inputting unit for inputting, while maintaining the location of the input focus in the first input area, the information designated by the key input, through the second input area, when it is determined by the determining unit that there is the key input.

(4-1) In the apparatus according to the fourth aspect of the present invention, the apparatus may further contain a guidance unit for indicating, on the display screen, which key input is predefined for inputting the information through the second input area, and is not predefined for inputting information through the first input area.

(4-2) In the apparatus according to the fourth aspect of the present invention, the key input can include simultaneous pressing of more than one key on the keyboard.

According to the fifth aspect of the present invention, there is provided an apparatus for allowing, while an input focus is located in a first input area on a display screen, an input of information through one of second and third input areas on the display screen. The apparatus contains: a first determining unit for determining, while the input focus is located in the first input area, whether or not there is a first key input from a keyboard, where the first key input is predefined for inputting information through either of the second and third input areas, and is not predefined for inputting information through the first input area; a second determining unit for determining whether or not there is a second key input which is predefined to designate the second input area; a first inputting unit for inputting, while maintaining the location of the input focus in the first input area, the information designated by the first key input, through the second input area, when it is determined by the first and second determining unit that there are the first and second key inputs, respectively; and a second inputting unit for inputting, while maintaining the location of the input focus in the first input area, the information designated by the first key input, through the third input area, when it is determined by the first determining unit that there is the first key input, and it is determined by the second determining unit that there is no second key input.

(5-1) In the apparatus according to the fifth aspect of the present invention, the apparatus may further contain a guidance unit for indicating, on the display screen, which key input is predefined for inputting the information through the second input area, and is not predefined for inputting information through the first input area.

(5-2) In the apparatus according to the fifth aspect of the present invention, the apparatus may further contain a guidance unit for indicating, on the display screen, which key input is predefined as the second key input.

(5-3) In the apparatus according to the fifth aspect of the present invention, each of the first and second key inputs can include simultaneous pressing of more than one key on the keyboard.

According to the sixth aspect of the present invention, there is provided an apparatus for allowing, while an input focus is located in a first input area on a display screen, an input of information through one of a plurality of second input areas on the display screen. The apparatus contains: a first determining unit for determining, while the input focus is located in the first input area, whether or not there is a first key input from a keyboard, where the first key input is predefined for inputting information through either of the plurality of second input areas, and is not predefined for inputting information through the first input area; a second determining unit for receiving one of a plurality of predefined second key inputs designating the plurality of second input areas, respectively, and determining one of the plurality second input areas which the above one of the plurality of second key inputs designates; and an inputting unit for inputting, while maintaining the location of the input focus in the first input area, the information designated by the first key input, through the above one of the plurality of second input areas which is determined by the second determining unit when it is determined by the first determining unit that there is the first key input, and the above one of the plurality second input areas which the above one of the plurality of predefined second key inputs designates is determined by the second determining unit.

(6-1) In the apparatus according to the sixth aspect of the present invention, the apparatus may further contain a guidance unit for indicating, on the display screen, which key input is predefined for inputting the information through the second input area, and is not predefined for inputting information through the first input area.

(6-2) In the apparatus according to the sixth aspect of the present invention, the apparatus may further contain a guidance unit for indicating, on the display screen, which key inputs are respectively predefined as the plurality of predefined second key inputs.

(6-3) In the apparatus according to the sixth aspect of the present invention, each of the first and second key inputs can include simultaneous pressing of more than one key on the keyboard.

According to the seventh aspect of the present invention, there is provided a computer-readable storage medium in which a program is stored, where the program, when used with a computer, directs the computer to execute the process according to the first aspect of the present invention.

(7-1) In the computer-readable storage medium according to the seventh aspect of the present invention, the key strokes for the key input can include simultaneous pressing of more than one key on the keyboard.

According to the eighth aspect of the present invention, there is provided a computer-readable storage medium in which a program is stored, where the program, when used with a computer, directs the computer to execute the process according to the second aspect of the present invention.

(8-1) In the computer-readable storage medium according to the eighth aspect of the present invention, the key strokes for each of the first and second key inputs can include simultaneous pressing of more than one key on the keyboard.

According to the ninth aspect of the present invention, there is provided a computer-readable storage medium in which a program is stored, where the program, when used with a computer, directs the computer to execute the process according to the third aspect of the present invention.

(9-1) In the computer-readable storage medium according to the ninth aspect of the present invention, the key strokes for each of the first and second key inputs can include simultaneous pressing of more than one key on the keyboard.

According to the tenth aspect of the present invention, there is provided a process for changing a location of an input focus from a first input area on a display screen to a second input area on the display screen. The process contains the steps of: (a) determining, while the input focus is located in the first input area, whether or not there is a key input from a keyboard, where the key input is predefined for inputting information through the second input area, and is not predefined for inputting information through the first input area; (b) inputting the above information designated by the above key input, through the second input area, when it is determined in step (a) that there is the above key input; and (c) changing the location of the input focus from the first input area to the second input area when it is determined in step (a) that there is the above key input.

According to the eleventh aspect of the present invention, there is provided a process for changing a location of an input focus from a first input area on a display screen to one of second and third input areas on the display screen. The process contains the steps of: (a) determining, while the input focus is located in the first input area, whether or not there is a first key input from a keyboard, where the first key input is predefined for inputting information through either of the second and third input areas, and is not predefined for inputting information through the first input area; (b) determining whether or not there is a second key input which is predefined to designate the second input area; (c) inputting the above information designated by the above first key input, through the second input area, when it is determined in steps (a) and (b) that there are the above first and second key inputs, respectively; (d) inputting the above information designated by the above first key input, through the third input area, when it is determined in step (a) that there is the above first key input and it is determined in step (b) that there is no above second key input; (e) changing the location of the input focus from the first input area to the second input area when it is determined in steps (a) and (b) that there are the above first and second key inputs, respectively; and (f) changing the location of the input focus from the first input area to the third input area when it is determined in step (a) that there is the above first key input, and it is determined in step (b) that there is no above second key input.

According to the twelfth aspect of the present invention, there is provided a process for changing a location of an input focus from a first input area on a display screen to one of a plurality of second input areas on the display screen. The process contains the steps of: (a) determining, while the input focus is located in the first input area, whether or not there is a first key input from a keyboard, where the above first key input is predefined for inputting information through either of the plurality of second input areas, and is not predefined for inputting information through the first input area; (b) receiving one of a plurality of predefined second key inputs designating the plurality of second input areas, respectively, and determining one of the plurality of second input areas which the above one of the plurality of second key inputs designates; (c) inputting the above information designated by the above first key input, through the above one of the plurality of second input areas which is determined in step (b) when it is determined in step (a) that there is the above first key input, and the above one of the plurality of second input areas which the above one of the plurality of predefined second key inputs designates is determined in step (b); and (d) changing the location of the input focus from the first input area to the above one of the plurality of second input areas which is determined in step (b) when it is determined in step (a) that there is the above first key input, and the above one of the plurality of second input areas which the above one of the plurality of second key inputs designates is determined in step (b).

According to the thirteenth aspect of the present invention, there is provided an apparatus for changing a location of an input focus from a first input area on a display screen to a second input area on the display screen. The apparatus contains: a determining unit for determining, while the input focus is located in the first input area, whether or not there is a key input from a keyboard, where the above key input is predefined for inputting information through the second input area, and is not predefined for inputting information through the first input area; an inputting unit for inputting the above information designated by the above key input, through the second input area, when it is determined by the determining unit that there is the above key input; and a changing unit for changing the location of the input focus from the first input area to the second input area when it is determined by the determining unit that there is the above key input.

According to the fourteenth aspect of the present invention, there is provided an apparatus for changing a location of an input focus from a first input area on a display screen to one of the second and third input reason the display screen. The apparatus contains: a first determining unit for determining, while the input focus is located in the first input area, whether or not there is a first key input from a keyboard, where the above first key input is predefined for inputting information through either of the second and third input areas, and is not predefined for inputting information through the first input area; a second determining unit for determining whether or not there is a second key input which is predefined to designate the second input area; a first inputting unit for inputting the above information designated by the above first key input, through the second input area, when it is determined by the first and second determining units that there are the above first and second key inputs, respectively; a second inputting unit for inputting the above information designated by the above first key input, through the above third input area, when it is determined by the first determining unit that there is the above first key input, and it is determined by the second determining unit that there is no above second key input; a first changing unit for changing the location of the input focus from the first input area to the second input area when it is determined by the first and second determining units that there are the above first and second key inputs, respectively; and a second changing unit for changing the location of the input focus from the first input area to the third input area when it is determined by the first determining unit that there is the above first key input, and it is determined by the second determining unit that there is no above second key input.

According to the fifteenth aspect of the present invention, there is provided an apparatus for changing a location of an input focus from a first input area on a display screen to one of a plurality of second input areas on the display screen. The apparatus contains: a first determining unit for determining, while the input focus is located in the first input area, whether or not there is a first key input from a keyboard, where the above first key input is predefined for inputting information through either of the plurality of second input areas, and is not predefined for inputting information through the first input area; a second determining unit for receiving one of a plurality of predefined second key inputs designating the plurality of second input areas, respectively, and determining one of the plurality second input areas which the above one of the plurality of second key inputs designates; an inputting unit for inputting the above information designated by the above first key input, through the above one of the plurality of second input areas which is determined by the second determining unit when it is determined by the first determining unit that there is the above first key input, and the above one of the plurality of second input areas which the above one of the plurality of predefined second key inputs designates is determined by the second determining unit; and a changing unit for changing the location of the input focus from the first input area to the above one of the plurality of second input areas which is determined by the second determining unit when it is determined by the first determining unit that there is the above first key input, and the above one of the plurality of second input areas which the above one of the plurality of second key inputs designates is determined by the second determining unit.

According to the sixteenth aspect of the present invention, there is provided a computer-readable storage medium in which a program is stored, where the program, when used with a computer, directs the computer to execute the process according to the tenth aspect of the present invention.

According to the seventeenth aspect of the present invention, there is provided a computer-readable storage medium in which a program is stored, where the program, when used with a computer, directs the computer to execute the process according to the eleventh aspect of the present invention.

According to the eighteenth aspect of the present invention, there is provided a computer-readable storage medium in which a program is stored, where the program, when used with a computer, directs the computer to execute the process according to the twelfth aspect of the present invention.

BRIEF DESCRIPTION OF THE DRAWINGS

In the drawings:

FIGS. 8A and 8B are diagrams illustrating an example of a detailed process flow of the word registration support program 26 corresponding to the process flow of FIG. 7;

FIG. 10 is a diagram illustrating a dialog box which is displayed on the display screen by a symbol input program.

DESCRIPTION OF THE PREFERRED EMBODIMENTS

Figure 1:
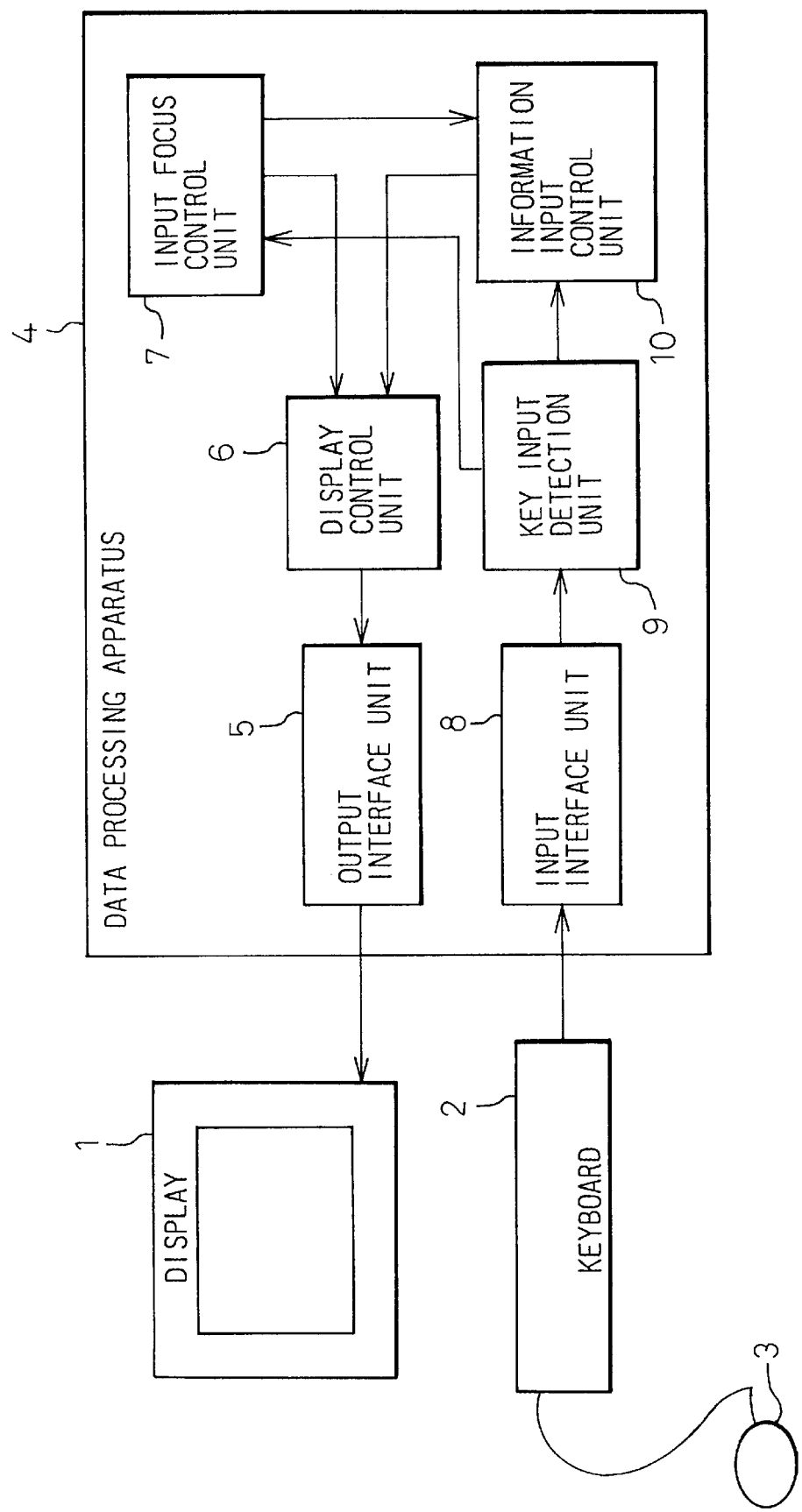
FIG. 1 is a block diagram illustrating an outline of a typical construction of a system in which the process according to the present invention is executed.

Outline of System Construction (FIG. 1)

FIG. 1 is a block diagram illustrating an outline of a typical construction of a system in which the process according to the present invention is executed. The apparatus according to the present invention is realized in the system of FIG. 1. In FIG. 1, reference numeral 1 denotes a display device, 2 denotes a keyboard, 3 denotes a mouse, 4 denotes a data processing apparatus, 5 denotes an output interface unit, 6 denotes a display control unit, 7 denotes an input focus control unit, 8 denotes an input interface unit, 9 denotes a key input detection unit, and 10 denotes an information input control unit. The data processing apparatus 4 is a computer or other programmable apparatus, and can be constructed by hardware logic circuits which may include programmable logic circuits, a programmable computer in which software is installed, and a combination of the hardware logic circuits and the programmable computer. Each of the output interface unit 5, the display control unit 6, the input focus control unit 7, the input interface unit 8, the key input detection unit 9, and the information input control unit 10, can be realized by hardware logic circuitry, software on a computer, or a combination of them.

The input interface unit 8 functions as an interface for data input from the keyboard 2 and the mouse 3, and the output interface unit 5 functions as an interface for data output to the display unit 1. Key inputs from the keyboard 2 are each detected by the key input detection unit 9, and the information input control unit 10 inputs into the data processing apparatus 4 information which is represented by the key inputs. The display control unit 6 generates and supplies, to the display unit 1, image data to be displayed on the screen of the display unit 1. The input focus control unit 7 determines a location of an input focus at one of a plurality of input areas, i.e., determines one of a plurality of input areas as an input area through which an operator of the data processing apparatus is invited to input information. The input focus control unit 7 further controls the display control unit 6 to indicate on the display unit 1 the determined location of the input focus.

Figure 2:
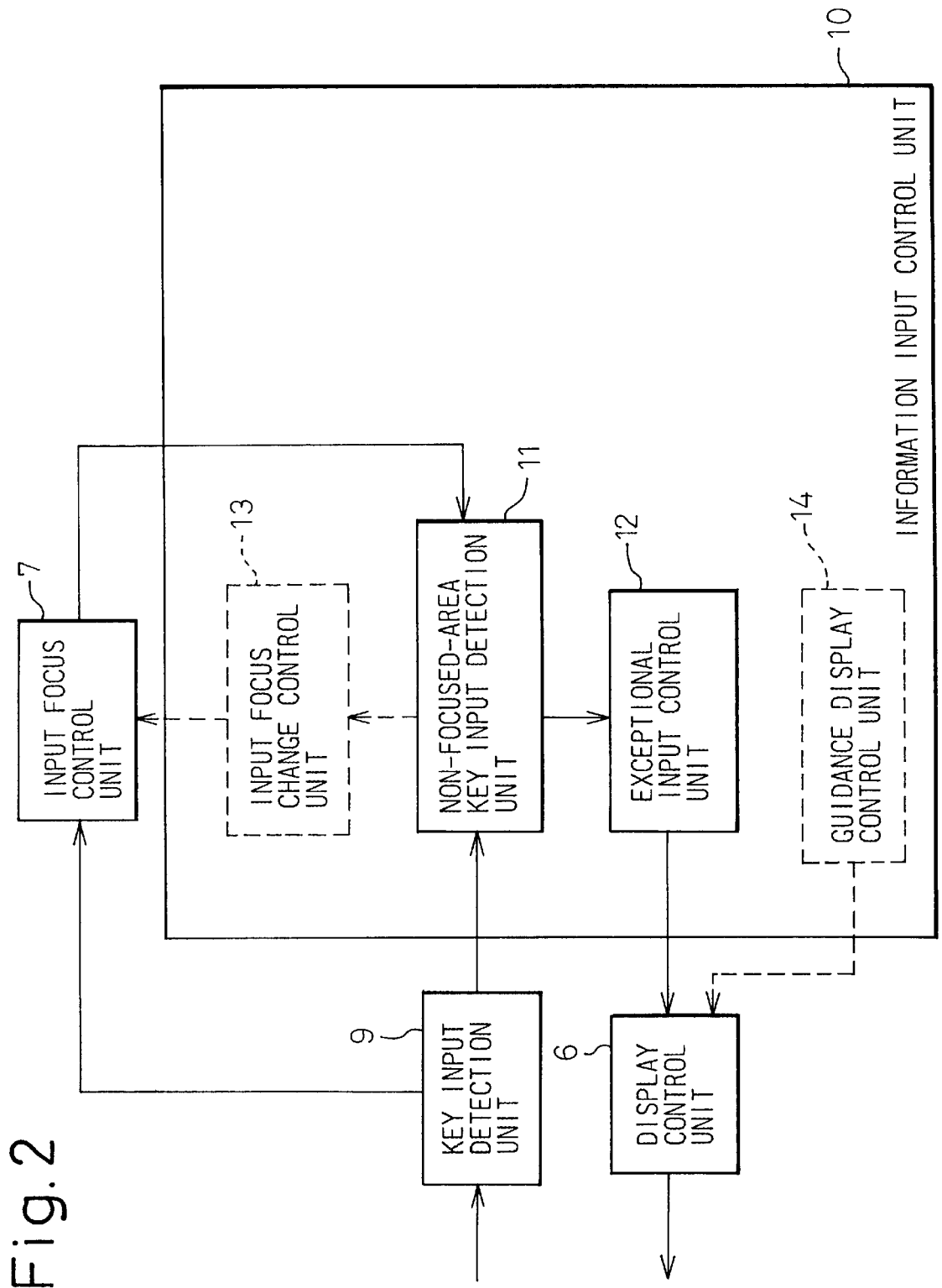
FIG. 2 is a diagram illustrating the basic constructions of the various aspects of the present invention.

Basic Constructions of Invention (FIG. 2)

FIG. 2 is a diagram illustrating the basic construction of the various aspects of the present invention. In FIG. 2, reference numeral 11 denotes a non-focused-area key input detection unit, 12 denotes an exceptional input control unit, and 13 denotes an input focus change control unit. The same elements as FIG. 1 have the same reference numerals as FIG. 1, respectively.

In the case wherein the information input control unit 10 functions as the apparatus defined in the aforementioned fourth aspect of the present invention, the non-focused-area key input detection unit 11 functions as the determining unit, and the exceptional input control unit 12 functions as the inputting unit in the fourth aspect of the present invention. Apparently, the process defined in the first aspect of the present invention is executed by the apparatus according to the fourth aspect of the present invention.

Namely, when the information control unit 10 operates according to the fourth aspect of the present invention, the non-focused-area key input detection unit 11 determines, while the input focus is located in a first input area, whether or not there is a key input from a keyboard, where the key input is predefined for inputting information through a second input area, and is not predefined for inputting information through the first input area. When it is determined by the determining unit that there is the key input, the exceptional input control unit 12 inputs, while maintaining the location of the input focus in the first input area, the information designated by the key input, through the second input area. Thus, the information control unit 10 allows, while the input focus is located in the first input area on the display screen, an input of information through the second input area on the display screen, in response to a key input.

In the case wherein the information input control unit 10 functions as the apparatus defined in the aforementioned fifth aspect of the present invention, the non-focused-area key input detection unit 11 functions as the first determining unit, and the exceptional input control unit 12 contains the second determining unit, and the first and second inputting units in the fifth aspect of the present invention. Apparently, the process defined in the second aspect of the present invention is executed by the apparatus according to the fifth aspect of the present invention.

Namely, when the information control unit 10 operates according to the fifth aspect of the present invention, the non-focused-area key input detection unit 11 determines, while an input focus is located in a first input area, whether or not there is a first key input from a keyboard, where the first key input is predefined for inputting information through either of second and third input areas, and is not predefined for inputting information through the first input area. The exceptional input control unit 12 determines whether or not there is a second key input which is predefined to designate the second input areas When it is determined that there are the first and second key inputs, the exceptional input control unit 12 inputs, while maintaining the location of the input focus in the first input area, the information designated by the first key input, through the second input area. When it is determined that there is the first key input, and it is determined that there is no second key input, the exceptional input control unit 12 inputs, while maintaining the location of the input focus in the first input area, the information designated by the first key input, through the third input area. Thus, the information control unit 10 allows, while the input focus is located in the first input area on the display screen, an input of information through one of the second and third input areas on the display screen, in response to a key input.

In the case wherein the information input control unit 10 functions as the apparatus defined in the aforementioned sixth aspect of the present invention, the non-focused-area key input detection unit 11 functions as the first determining unit, and the exceptional input control unit 12 contains the second determining unit, and the inputting unit in the sixth aspect of the present invention. Apparently, the process defined in the third aspect of the present invention is executed by the apparatus according to the sixth aspect of the present invention.

Namely, when the information control unit 10 operates according to the sixth aspect of the present invention, the non-focused-area key input detection unit 11 determines, while the input focus is located in the first input area, whether or not there is a first key input from a keyboard, where the first key input is redefined for inputting information through either of the plurality of second input areas, and is not predefined for inputting information through the first input area. The exceptional input control unit 12 receives one of a plurality of predefined second key inputs designating the plurality of second input areas, respectively, and determines which one of the plurality of second input areas the above one of the plurality of second key inputs designates. When it is determined that there is the first key input, and the above one of the plurality of second input areas which the above one of the plurality of predefined second key inputs designates is determined, the exceptional input control unit 12 inputs, while maintaining the location of the input focus in the first input area, the information designated by the first key input, through the above one of the plurality of second input areas which is determined by the second determining unit. Thus, the information control unit 10 allows, while the input focus is located in the first input area on the display screen, an input of information through one of the plurality of second input areas on the display screen, in response to a key input.

In addition, as an additional (optional) element in each of the above constructions of the fourth, fifth, and sixth aspects of the present invention, the guidance display control unit 14 functions as the guidance units as defined in (4-1), (5-1) or (5-2), and (6-1) or (6-2) of "SUMMARY OF THE INVENTION" for the fourth, fifth, and sixth aspects of the present invention, respectively.

In the case wherein the information input control unit 10 functions as the apparatus defined in the aforementioned thirteenth aspect of the present invention, the non-focused-area key input detection unit 11 functions as the determining unit, the exceptional input control unit 12 functions as the inputting unit, and the input focus change control unit 13 functions as the changing unit in the thirteenth aspect of the present invention. The process defined in the tenth aspect of the present invention is executed by the apparatus according to the thirteenth aspect of the present invention.

Namely, when the information control unit 10 operates according to the thirteenth aspect of the present invention, the non-focused-area key input detection unit 11 determines, while the input focus is located in a first input area, whether or not there is a key input from a keyboard, where the key input is predefined for inputting information through a second input area, and is not predefined for inputting information through the first input area. When it is determined by the determining unit that there is the key input, the exceptional input control unit 12 inputs the information designated by the key input, through the second input area. Either before, after, or in parallel with the operation of the exceptional input control unit 12, the input focus change control unit 13 changes the location of the input focus from the first input area to the second input area when it is determined by the determining unit that there is the above key input. Thus, the information control unit 10, in response to one key input, allows, even when the input focus is located in the first input area on the display screen, an input of information through the second input area on the display screen, and at the same time a change of the location of the input focus from the first input area to the second input area.

In the case wherein the information input control unit 10 functions as the apparatus defined in the aforementioned fourteenth aspect of the present invention, the non-focused-area key input detection unit 11 functions as the first determining unit, the exceptional input control unit 12 contains the second determining unit, and the first and second inputting units, and the input focus change control unit 13 functions as the first and second changing units in the fourteenth aspect of the present invention. The process defined in the eleventh aspect of the present invention is executed by the apparatus according to the fourteenth aspect of the present invention.

Namely, when the information control unit 10 operates according to the fourteenth aspect of the present invention, the non-focused-area key input detection unit 11 determines, while an input focus is located in a first input area, whether or not there is a first key input from a keyboard, where the first key input is predefined for inputting information through either of second and third input areas, and is not predefined for inputting information through the first input area. The exceptional input control unit 12 determines whether or not there is a second key input which is predefined to designate the second input area. When it is determined that there are the first and second key inputs, the exceptional input control unit 12 inputs the information designated by the first key input, through the second input area. When it is determined that there is the first key input, and it is determined that there is not the second key input, the exceptional input control unit 12 inputs the information designated by the first key input, through the third input area. When it is determined that there are the above first and second key inputs, respectively, the input focus change control unit 13 changes the location of the input focus from the first input area to the second input area, either before, after, or in parallel with the operation of the exceptional input control unit 12. When it is determined that there is the above first key input, and it is determined that there is no above second key input, the input focus change control unit 13 changes the location of the input focus from the first input area to the third input area. Thus, the information control unit 10, in response to one key input, allows, even when the input focus is located in the first input area on the display screen, an input of information through one of the second and third input areas on the display screen and, at the same time, a change of the location of the input focus from the first input area to one of the second and third input areas.

In the case wherein the information input control unit 10 functions as the apparatus defined in the aforementioned fifteenth aspect of the present invention, the non-focused-area key input detection unit 11 functions as the first determining unit, and the exceptional input control unit 12 contains the second determining unit, and the inputting unit in the fifteenth aspect of the present invention. The process defined in the twelfth aspect of the present invention is executed by the apparatus according to the fifteenth aspect of the present invention.

Namely, when the information control unit 10 operates according to the fifteenth aspect of the present invention, the non-focused-area key input detection unit 11 determines, while the input focus is located in the first input area, whether or not there is a first key input from a keyboard, where the first key input is predefined for inputting information through either of the plurality of second input areas, and is not predefined for inputting information through the first input area. The exceptional input control unit 12 receives one of a plurality of predefined second key inputs designating the plurality of second input areas, respectively, and determines one of the plurality of second input areas which the above one of the plurality of second key inputs designates. When it is determined that there is the first key input, and the above one of the plurality of second input areas which the above one of the plurality of predefined second key inputs designates is determined, the exceptional input control unit 12 inputs the information designated by the first key input, through the above one of the plurality of second input areas which is determined by the second determining unit. When it is determined that there is the above first key input, and the above one of the plurality second input areas which the above one of the plurality of second key inputs designates is determined, the input focus change control unit 13 changes the location of the input focus from the first input area to the above determined one of the plurality of second input areas. Thus, the information control unit 10, in response to one key input, allows, even when the input focus is located in the first input area on the display screen, an input of information through one of the plurality of second input areas on the display screen, and at the same time a change of the location of the input focus from the first input area to one of the plurality of second input areas.

Each of the non-focused-area key input detection unit 11, the exceptional input control unit 12, the input focus change control unit 13, and the guidance display control unit 14, can be realized by hardware logic circuitry, software on a computer, or a combination of them.

System Construction of Embodiment (FIGS. 3, 4, 5, and 6)

Figure 3:
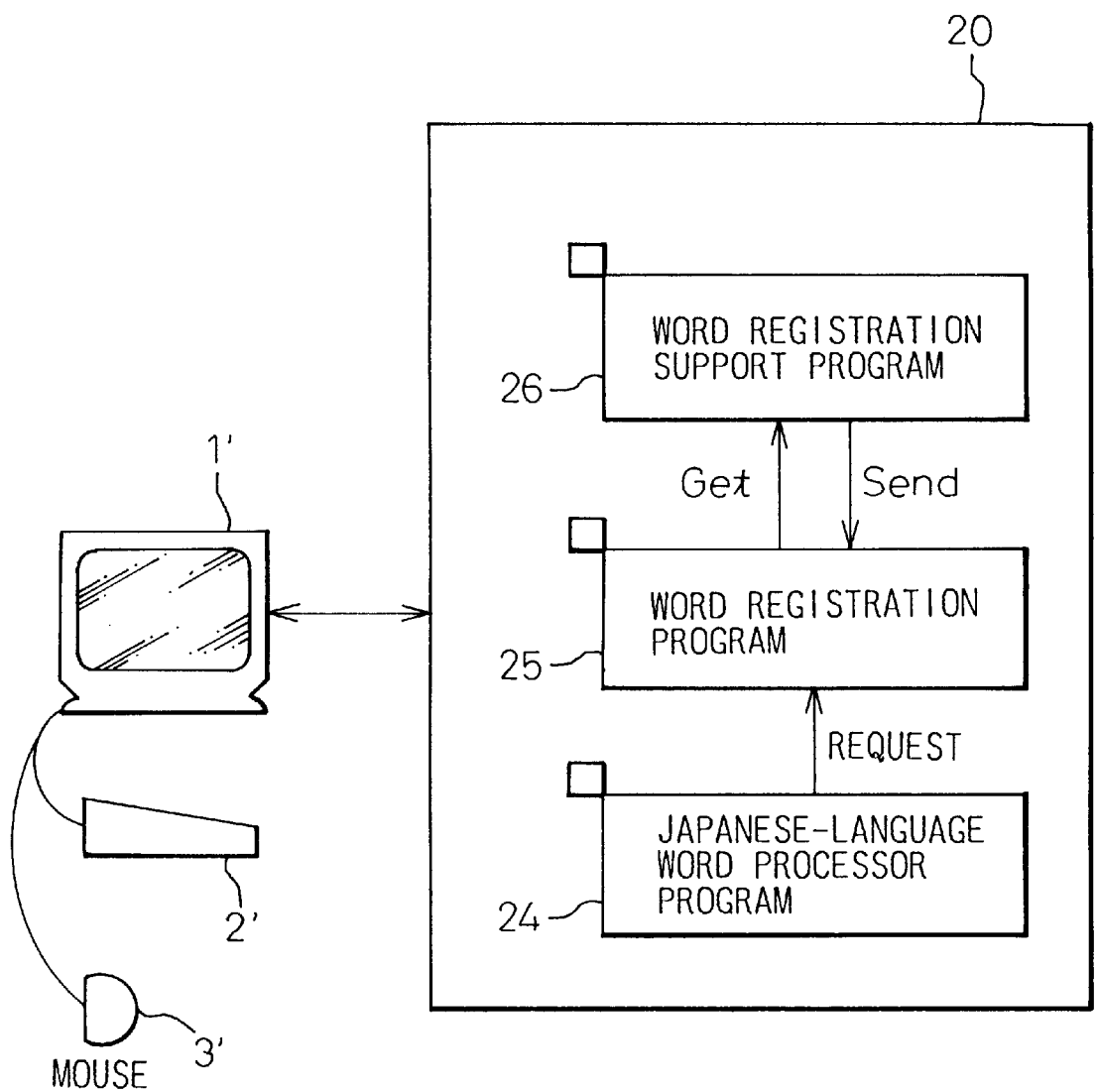
FIG. 3 is a block diagram illustrating an outline of the construction of an embodiment of the present invention.

FIG. 3 is a block diagram illustrating an outline of the construction of an embodiment of the present invention. In FIG. 3, reference numeral 1' denotes a display unit, 2' denotes a keyboard, 3' denotes a mouse, 20 denotes a data processing apparatus, for example, a personal computer, 24 denotes a Japanese-language word processing program installed on the data processing apparatus 20, 25 denotes a Japanese-language word registration program which operates in response to a request from the Japanese-language word processing program 24, and 26 denotes a word registration support program which realizes the functions of the present invention as explained below. Namely, in this embodiment, the functions of the present invention are provided in the form of a support program which is produced separately, and cooperates with a second program which operates in response to keyboard inputs, so that the functions of the present invention can be utilized in the operations of the second program in response to the keyboard inputs. Of course, the functions of the present invention may be incorporated in the second program when the second program is produced.

The Japanese language is represented by Kanji characters and Kana characters, and the respective Japanese words are often represented by one or more Kanji characters or a combination of one or more Kanji characters and one or more Kana characters. The Kana characters can represent pronunciations of Japanese words, and character keys provided on a keyboard correspond to the Kana characters. Therefore, when an operator wishes to input a word represented by one or more Kanji characters or a combination of one or more Kanji characters and one or more Kana characters, the operator first inputs one or more Kana characters representing the pronunciation of the word, and then performs a key operation for converting the one or more Kana characters representing the pronunciation of the word to the one or more Kanji characters or the combination of one or more Kanji characters and one or more Kana characters representing the word. For realizing such a conversion, which is called Kana-Kanji conversions the correspondence between the one or more Kanji characters or the combination of one or more Kanji characters and one or more Kana characters representing the word, and the one or more Kana characters representing the pronunciation, must be registered in advance. Namely, when an operator of the Japanese-language word processing program wishes to input a new word which has not been registered yet, during the word processing operation, the operator must register the correspondence between the one or more Kanji characters or the combination of one or more Kanji characters and one or more Kana characters representing the word, and one or more Kana characters representing the pronunciation of the new word, before inputting the word in the word processing. The Japanese-language word registration program 25 is provided for this purpose, and is activated by the Japanese-language word processing program 24 when the operator inputs a command for using the Japanese-language word registration program 25 during the use of the Japanese-language word processing program 24.

Figure 4:
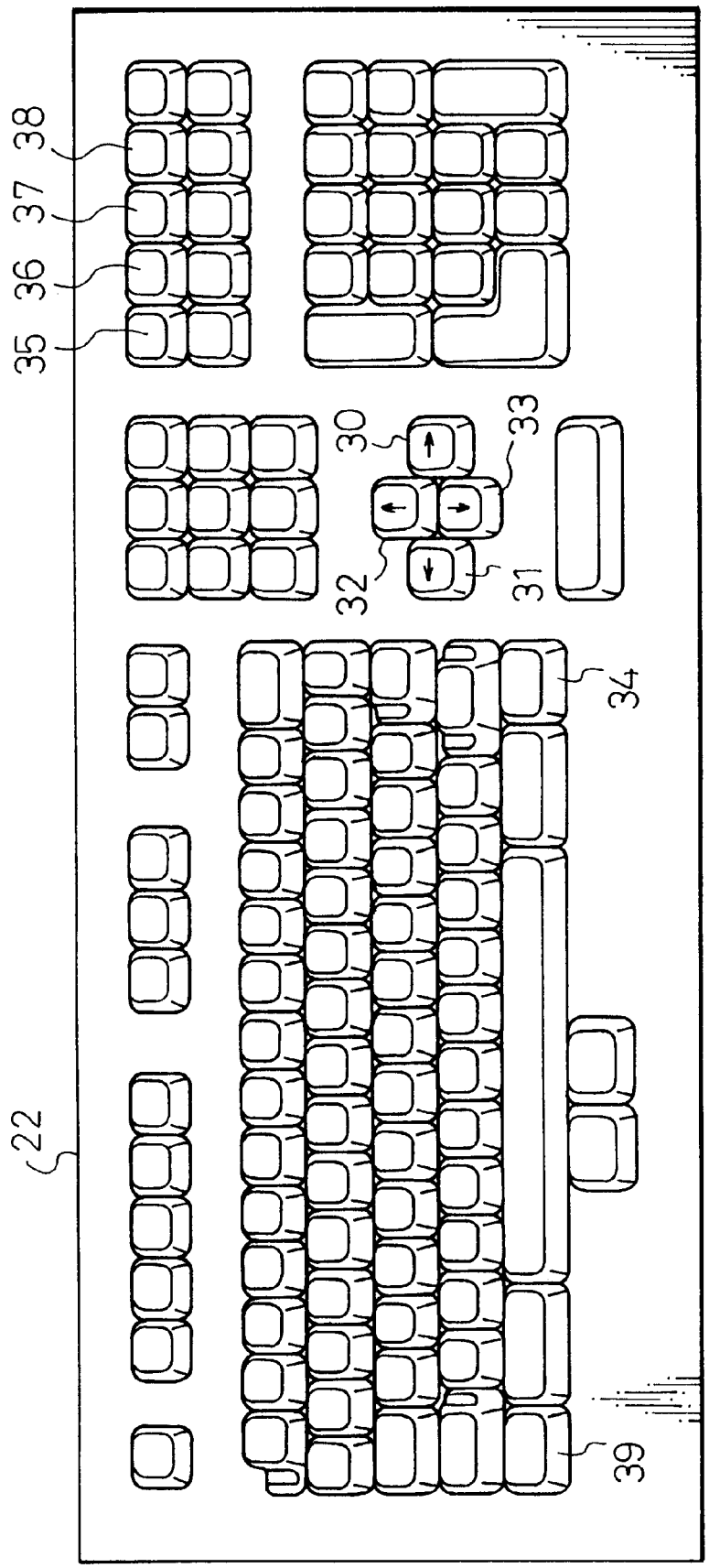
FIG. 4 is a diagram illustrating a typical keyboard.

FIG. 4 is a diagram illustrating a typical keyboard. In FIG. 4, reference numeral 22 denotes a keyboard, 30 denotes a Right key, 31 denotes a Left key, 32 denotes an Up key, 33 denotes a Down key, 34 denotes a Tab key, 35 denotes a Home key, 36 denotes an End key, 37 denotes a Page Up key, 38 denotes a Page Down key, and 39 denotes a control (Ctrl) key.

Figure 5:
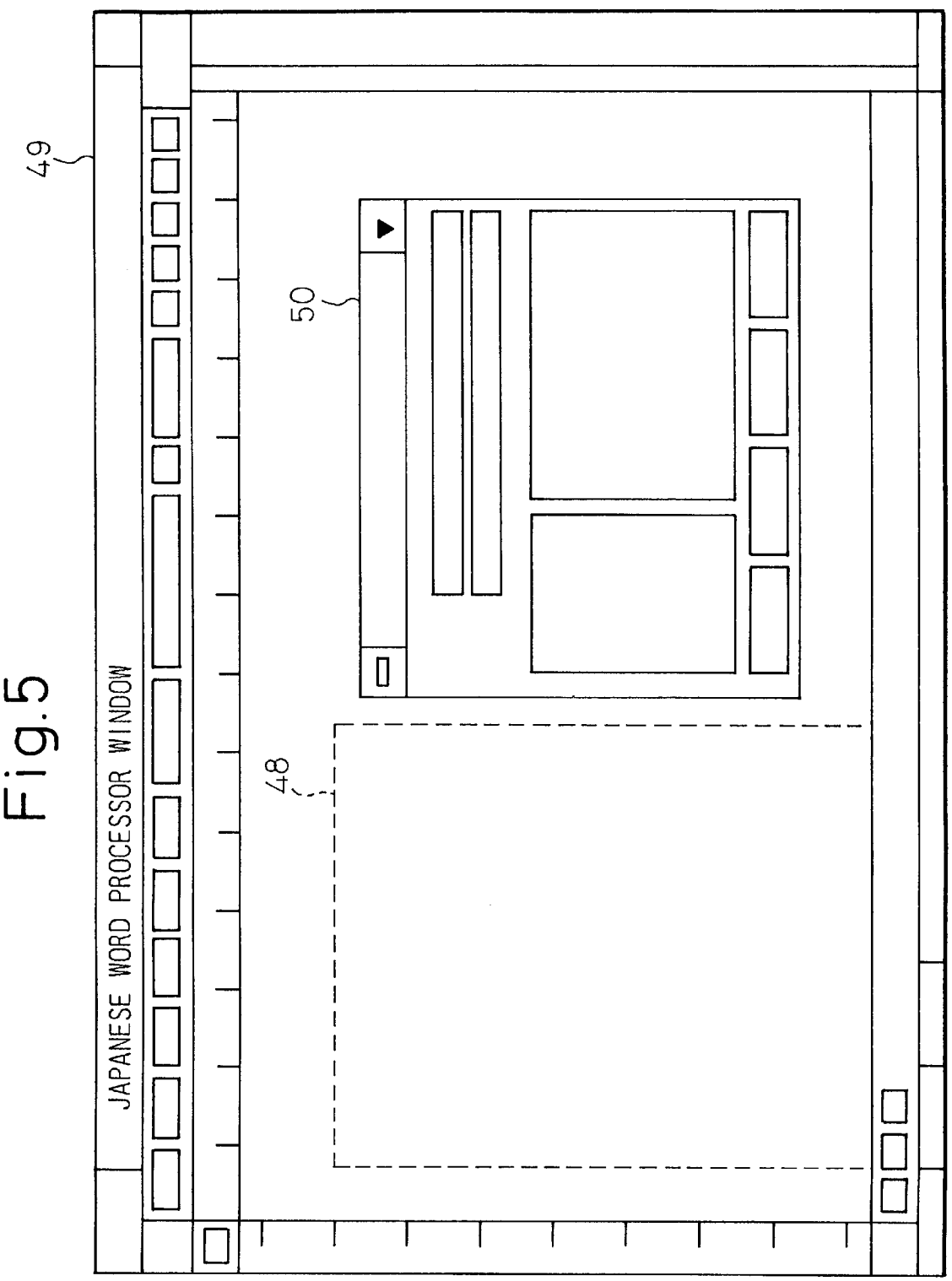
FIG. 5 is a diagram illustrating an example window which is displayed under the control of the Japanese-language word processing program operating on the Windows system and an example dialog box which is displayed under the control of the Japanese-language word registration program 25.

FIG. 5 is a diagram illustrating an example window which is displayed under the control of the Japanese-language word processing program operating on the Windows system and an example dialog box which is displayed under the control of the Japanese-language word registration program 25. In FIG. 5, reference numeral 49 denotes a window provided by the Japanese-language word processing program, 48 denotes a text area in the window, and 50 denotes a dialog box which is displayed under the control of the Japanese-language word registration program 25. The dialog box 50 in FIG. 5 appears on the screen when the operator inputs a command for calling the Japanese-language word registration program 25.

Figure 6:
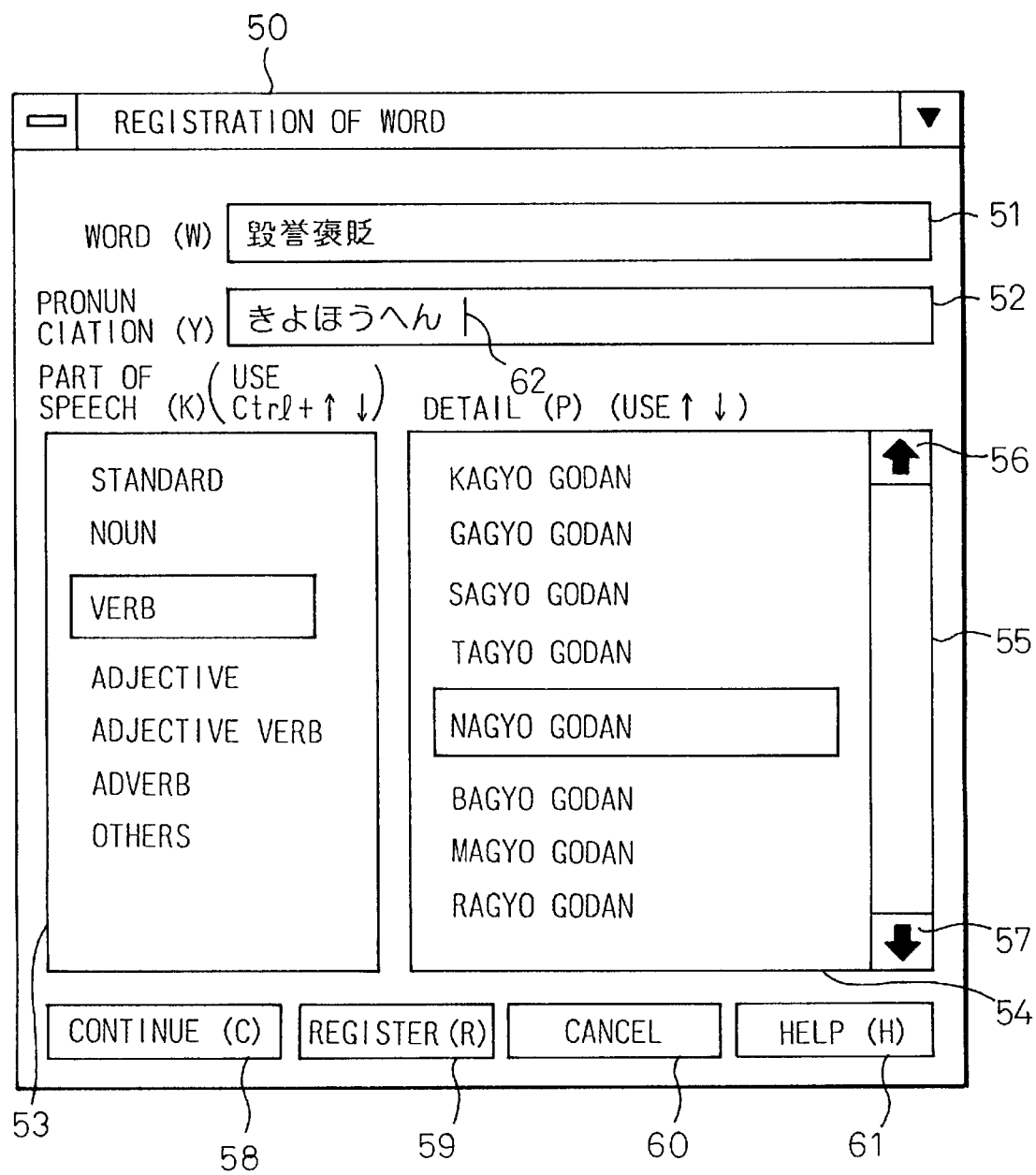
FIG. 6 is a diagram illustrating example indications in the dialog box 50 in FIG. 5.

FIG. 6 is a diagram illustrating example indications in the dialog box 50 in FIG. 5. In FIG. 6, reference numeral 51 denotes a first edit control (text box) for inputting therein a word represented by one or more Kanji characters to be registered by the Japanese-language word registration program 25, 52 denotes a second edit control (text box) for inputting therein the pronunciation of the word represented by one or more Kana characters to be registered by the Japanese-language word registration program 25 corresponding to the one or more Kanji characters in the first edit control 51, 53 denotes a first list box which indicates a column of available parts of speech one of which is to be selected as the part of speech of the word to be registered, 54 denotes a second list box which indicates a column of detailed conditions relating to the part of speech selected in the first list box 53, 55 denotes a scroll bar, 56 denotes an up scroll button for the second list box, 57 denotes a down scroll button for the second list box, 58 denotes a continue button, 59 denotes a register button, 60 denotes a cancel button, 61 denotes a help button, and 62 denotes a caret (a cursor indicating an insertion point). In FIG. 6, the contents in the first and second list boxes 53 and 54 and the command buttons 58 to 61 are indicated in English, and the contents of the first and second edit controls 51 and 52 are indicated by the Kanji and Kana characters, respectively, as in the dialog box in the actual Japanese-language word processing program 24.

In the first edit control 51, the operator can input the one or more Kanji characters, for example, by finding each of the one or more Kanji characters from a list of all available Kanji characters provided in the Japanese-language word processing program 24, and pasting each of the one or more Kanji characters therein. In the second edit control 52, the operator can input the one or more Kana characters by directly inputting Kana characters by pressing corresponding character keys on the keyboard. When an input focus is located in one of the first and second edit controls 51 and 52, a caret 62 appears in the edit control, or the content of the edit control may be highlighted. The caret may be a flashing vertical bar, and indicates the position at which the operator can input the next character. In the first list box 53, a selected one of the available parts of speech is indicated to be circumscribed by a rectangle, or to be highlighted, and the rectangle or the highlighting moves upward or downward corresponding to a press of the up key or down key, respectively. Similarly, in the second list box 541 a selected one of the detailed conditions, for example, possible conjugation types of a verb is indicated to be circumscribed by a rectangle, or to be highlighted, and the rectangle or the highlighting moves upward or downward corresponding to a press of the up key or down key, respectively. In addition, in the second list box 54, the scroll bar 55 having the up scroll button 56 and the down scroll button 57 is provided for scrolling the indication in the second list box 54.

The continue button 58 is to be clicked when the operator wishes to register another word after the current operation of word registration. The register button 59 is to be clicked when the operator wishes to register the correspondence between the Kanji characters currently indicated in the first edit control 51 and the Kana characters currently indicated in the second edit control 52, together with the selected part of speech and the selected conditions respectively indicated in the first and second list boxes 53 and 54. The cancel button is to be clicked when the operator wishes to cancel (quit) the operation of word registration, i.e., close the dialog box. The help button 61 is to be clicked when the operator wishes to use a guidance function for assisting the operator's use of the Japanese-language word processing program 24, where the guidance function is provided by the Japanese-language word processing program 24. Each of command buttons 58, 59 and 61 can be selected by pressing on the keyboard the Alt key and the preassigned character keys C, R, and H, respectively, instead of clicking them by using the mouse. The location of the input focus can be moved cyclically from one to the next among the first and second edit controls 51 and 52 and the first and second list boxes 53 and 54, by pressing the Tab key on the keyboard. The input focus can also be located to the first and second edit controls 51 and 52 and the first and second list boxes 53 and 54 by pressing on the keyboard the Alt key and the preassigned character keys W, Y. K, and P, respectively.

In this embodiment, according to the first to sixth aspects of the present invention, when the operator presses the Up key or Down key while the input focus is located in the first or second edit control 51 or 52, the Japanese-language word processing program 24 recognizes the input of the Up key or Down key as if the key input is made while the input focus is located in the second list box 54, and when the operator simultaneously presses the Ctrl (control) key and the Up key or Down key while the input focus is located in the first or second edit control 51 or 52, the Japanese-language word processing program 24 recognizes the simultaneous input of the Ctrl (control) key and the Up key or Down key as if the input of the Up key or Down key is made while the input focus is located in the first list box 53. The indication of "USE Ctrl + ↑↓" above the first list box 53 and the indication of "USE ↑↓" above the second list box 54 are provided for guidance.

The Japanese-language word registration program 25 is so produced that the key input by the Up key or the Down key is not defined in the text inputting operation in the first and second edit controls 51 and 52, and the key input by the Up key is defined as a command to move upward the selection in the indication of each of the first and second list boxes 53 and 54 when the input focus is located in the list box in advance, and the Down key is defined as a command to move downward the selection in the indication of the each of the first and second list boxes 53 and 54 when the input focus is located in the list box in advance. When the input focus is located in the first or second edit control, the simultaneous press of the Ctrl key with the above key input by the Up or Down key is defined as a command to move upward or downward the selection in the indication of the first list box 53, respectively, and the above key input by the Up or Down key without the simultaneous press of the Ctrl key is defined as a command to move upward or downward the selection in the indication of the second list box 54, respectively.

In addition, the Japanese-language word registration program 25 may be so produced that the pressing of the Page up and Page Down keys are not defined in the text inputting operation in the first and second edit controls 51 and 52, and are defined in the first and second list boxes 53 and 54. In the first and second list boxes 53 and 54, the key input by the Page Up key is defined as a command to move by one page upward the indication of each of the first and second list boxes 53 and 54 when the input focus is located in the list box in advance, and the Page Down key is defined as a command to move by one page downward the indication of the each of the first and second list boxes 53 and 54 when the input focus is located in the list box in advance. When the input focus is located in the first or second edit control, the simultaneous pressing of the Ctrl key with the above key input by the Page Up or Page Down key is defined as a command to move by one page upward or downward the selection in the indication of the first list box 53, respectively, and the above key input by the Page Up or Page Down key without the simultaneous press of the Ctrl key is defined as a command to move by one page upward or downward the selection in the indication of the second list box 54, respectively.

Further, the Japanese-language word registration program 25 may be so produced that the pressing of the Home and End keys are not defined in the text inputting operation in the first and second edit controls 51 and 52, and are defined in the first and second list boxes 53 and 54. In the first and second list boxes 53 and 54, the key input by the Home key is defined as a command to move the selection to the top item of the contents of each of the first and second list boxes 53 and 54 when the input focus is located in the list box in advance, and the End key is defined as a command to move the selection to the last (bottom) item of the contents of each of the first and second list boxes 53 and 54 when the input focus is located in the list box in advance. When the input focus is located in the first or second edit control, the simultaneous press of the Ctrl key with the above key input by the Home or End key is defined as a command to move the selection to the top or bottom item of the contents of the first list box 53, respectively, and the above key input by the Rome or End key without the simultaneous press of the Ctrl key is defined as a command to move the selection to the top or bottom item of the second list box 54, respectively.

Process Steps (FIGS. 7, 8A, 8E, and 9)

The Japanese-language word registration program 25 controls the operations relating to the dialog box for the word registration as indicated in FIG. 6 except for the operations according to the present invention corresponding to the operations of the non-focused-area key input detection unit 11, the exceptional input control unit 12, the input focus change control unit 13, and the guidance display control unit 14 which are explained before with reference to FIG. 2. Namely, the Japanese-language word registration program 25 controls the operations for the conventional word registration. In particular, regarding the operation of the input of information through a plurality of "controls" such as the first and second edit controls 51 and 52 and the first and second list boxes 53 and 54, the operator must designate the location of the input focus, before inputting information, by a specific operation such as the pressing of the Tab key or the specially predefined key after the pressing of the Alt key as explained above. That is, regarding the operation of the input of information through the "controls", the Japanese-language word registration program 25 functions as the input focus control unit 7 and the information input control unit 10 which were explained before with reference to FIG. 1.

As mentioned before, the word registration support program 26 (FIG. 3) is provided for cooperating with the Japanese-language word registration program 25 and realizing the functions of the present invention in the operations of inputting information through a plurality of "controls" in the word registration.

Figure 7:
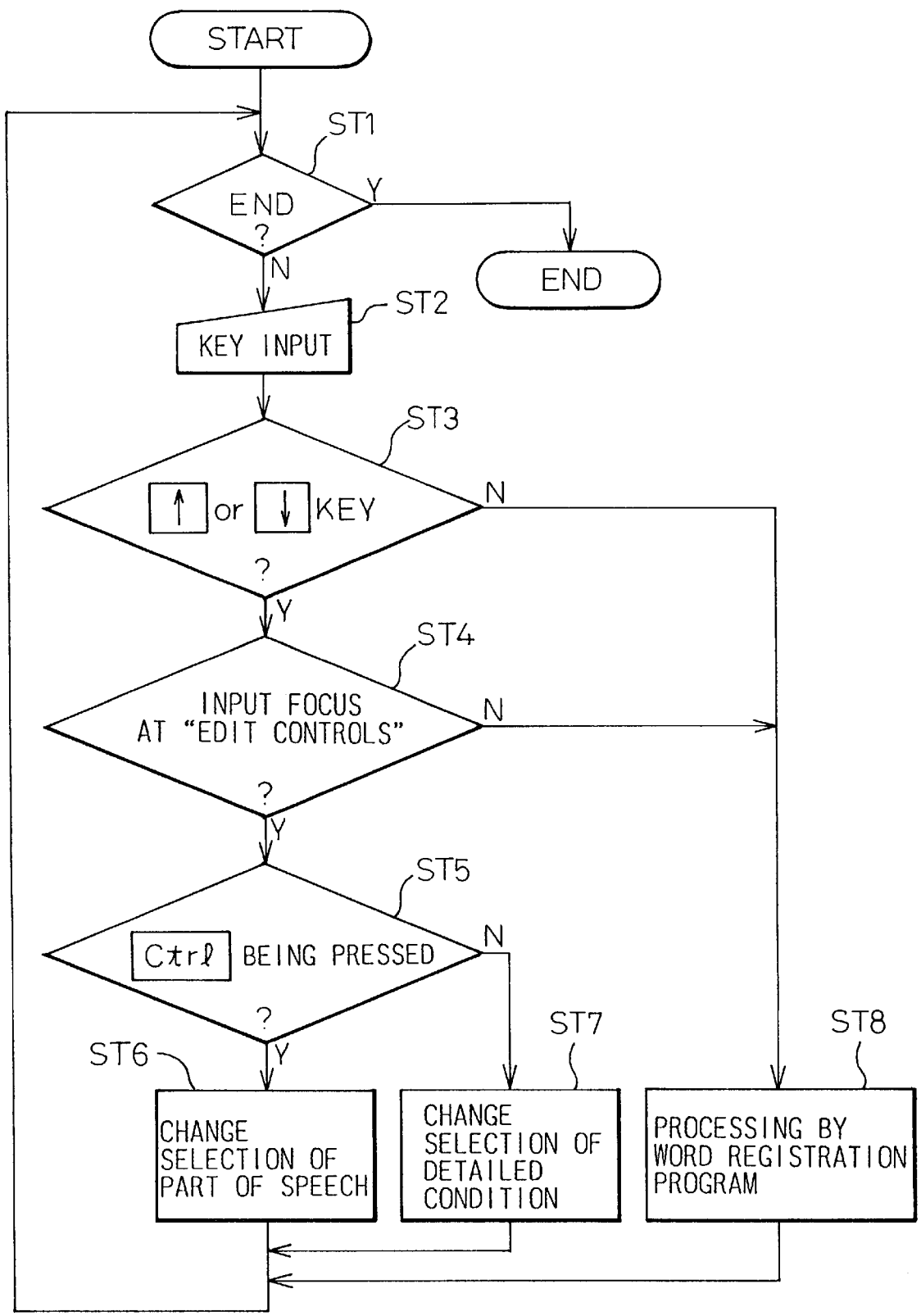
FIG. 7 is a diagram illustrating an outline of a process flow of the word registration support program 26 in the above embodiment of the present invention.

FIG. 7 is a diagram illustrating an outline of a process flow of the word registration support program 26 in the above embodiment of the present invention. In FIG. 7, in step ST1, it is determined whether or not the operation of the Japanese-language word registration program 25 is completed. When it is determined that the operation of the Japanese-language word registration program 2 is completed, the word registration support program 26 ends its operation. When it is determined that the operation of the Japanese-language word registration program 2 is not completed, the operation goes to step ST2 to input key input information. Then, in step ST3, it is determined whether or not either the Up key or the Down key is pressed. When it is determined that neither the Up key nor the Down key is pressed, the operation goes to step ST8, and the operation is returned to the Japanese-language word registration program 25. In the Japanese-language word registration program 25, the conventional processing in response to the key input information is carried out. Then, the operation goes back to step ST1 of the word registration support program 26. When it is determined in step ST3 that either the Up key or the Down key is pressed, the operation goes to step ST4, and it is determined whether or not the input focus is located at either the first edit control 51 or the second edit control 52. When it is determined that the input focus is located at neither the first edit control 51 nor the second edit control 52, the operation goes to step ST8, and the operation is returned to the Japanese-language word registration program 25. In the Japanese-language word registration program 25, the conventional processing in response to the key input information is carried out. Then, the operation goes back to step ST1 of the word registration support program 26. When it is determined in step ST4 that the input focus is located at either the first edit control 51 or the second edit control 52, the operation goes to step ST5, and it is determined whether or not the control (Ctrl) key is being pressed. When it is determined that the control (Ctrl) key is not being pressed, the operation goes to step ST7, and the selection in the second list box 54 is shifted upward or downward according to the above key input of the Up key or Down key, respectively. Then, the operation goes back to step ST1. When it is determined in step ST5 that the control (Ctrl) key is not being pressed, the operation goes to step ST6, and the selection in the second list box 54 is shifted upward or downward according to the above key input of the Up key or Down key, respectively. Then, the operation goes back to step ST1.

Figure 8A:
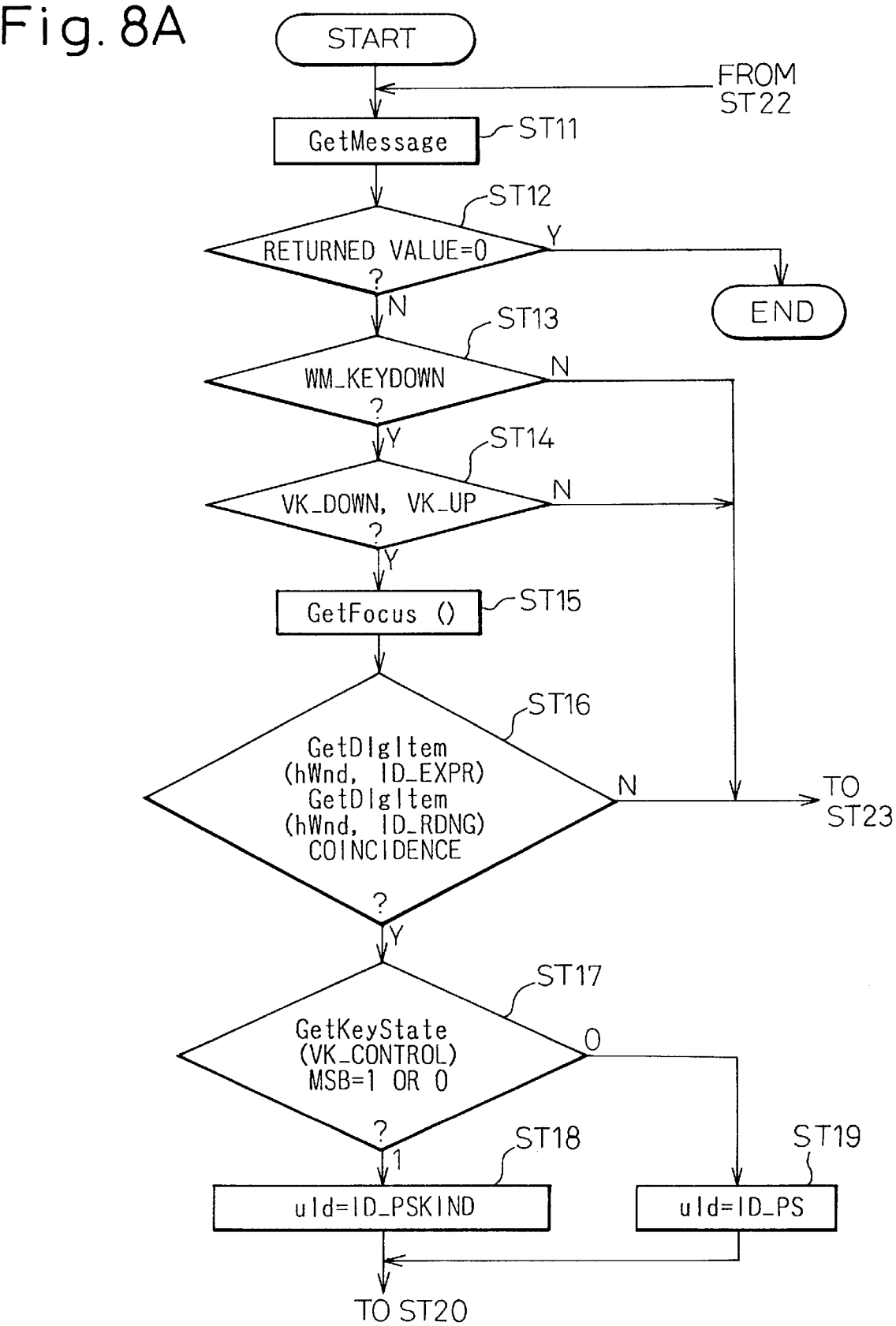
Figure 9:
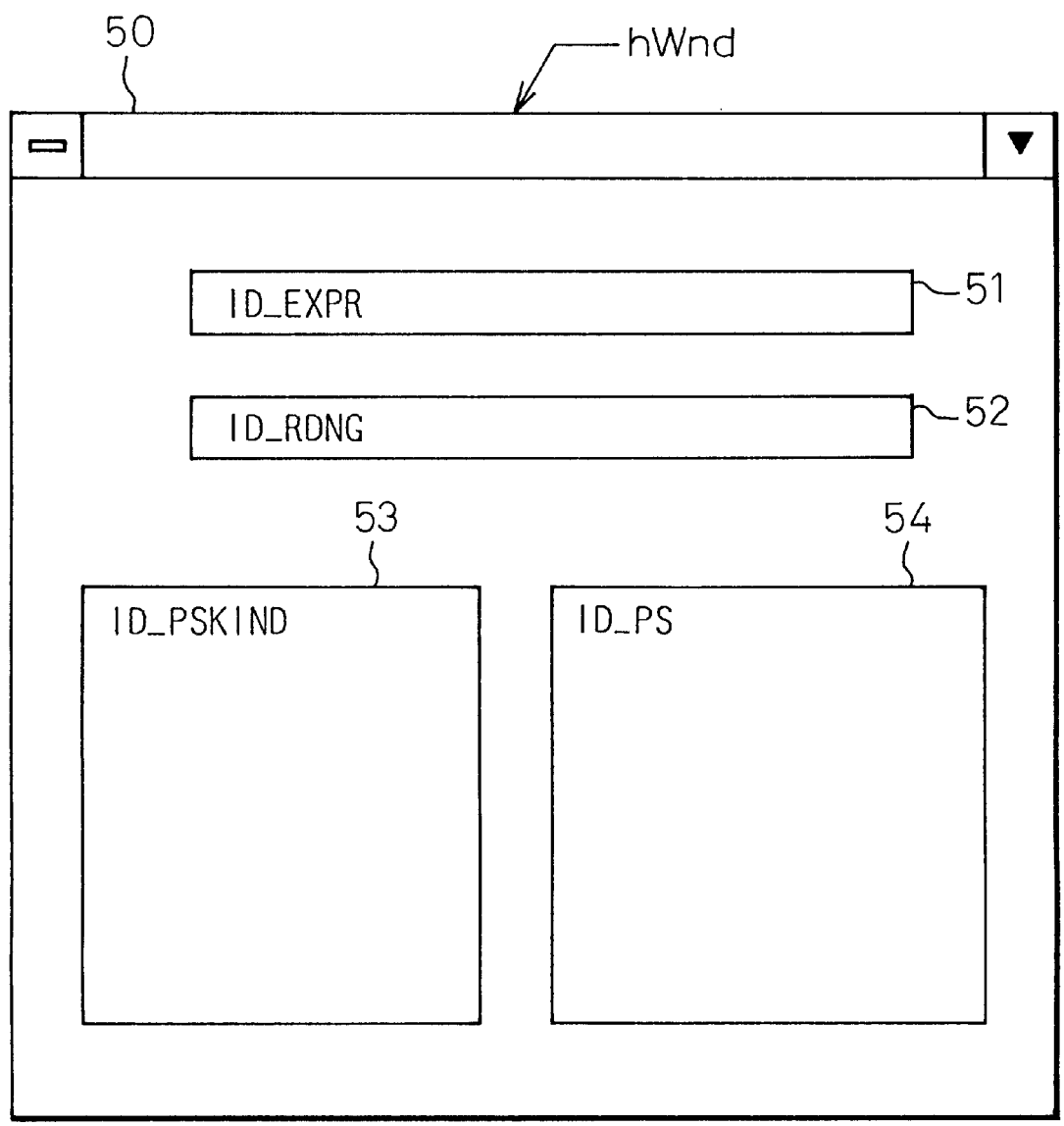
FIG. 9 is a diagram indicating the handles which are predefined for the respective windows.

FIGS. 8A and 8B are diagrams illustrating an example of a detailed process flow of the word registration support program 26 corresponding to the process flow of FIG. 7. In the flow of FIG. 8, the respective windows including the dialog box of FIG. 6, the first and second edit controls 51 and 52, and the first and second list boxes 53 and 54, are identified with their handles which are predefined in the Japanese-language word registration program 25. FIG. 9 is a diagram indicating the handles which are predefined for the respective windows. According to FIG. 9, the dialog box of FIG. 6 is identified with the handle "hWnd", the first and second edit controls 51 and 52 are respectively identified with the handles "ID_EXPR" and "ID_RDNG", and the first and second list boxes 53 and 54 are respectively identified with the handles "ID_PSKIND" and "ID_PS".

In FIG. 8A, in step ST11, a message "GetMessage" is generated and is sent to the Japanese-language word registration program 25 to receive a message from the Japanese-language word registration program 25. The message from the Japanese-language word registration program 25 contains a value which indicates whether or not the operation of the Japanese-language word registration program 25 is completed. In step ST12, it is determined whether or not this value is equal to "0". When it is determined in step ST12 that the value is equal to "0", the operation of the word registration support program 26 is completed. When it is determined in step ST12 that the above value is not equal to "0", the operation goes to step 13, and it is determined whether or not the received message contains a code "WM_KEYDOWN", which indicates that a key is pressed. When it is determined in step ST13 that the received message does not contain the code "WM_KEYDOWN", the operation goes to step ST23, and the operation is returned to the Japanese-language word registration program 25. In the Japanese-language word registration program 25, the conventional processing in response to the key input is carried out. Then, the operation goes back to step ST11 of the word registration support program 26. When it is determined in step ST13 that the received message contains the code "WM_KEYDOWN", the operation goes to step ST14, and it is determined whether or not the received message further contains a code "VK_DOWN" or "VK_UP", which indicate that the Down key or the Up key is pressed, respectively. When it is determined in step ST14 that the received message does not contain the code "VK_DOWN" nor "VK_UP", the operation goes to step ST23, and the operation is returned to the Japanese-language word registration program 25. In the Japanese-language word registration program 25, the conventional processing in response to the key input is carried out. Then, the operation goes back to step ST11 of the word registration support program 26. When it is determined in step ST14 that the received message further contains the code "VK_DOWN" or "VK_UP", the operation goes to step ST15, and a message "GetFocus ( )" is generated and is sent to the Japanese-language word registration program 25, to receive a handle of a "control" at which the input focus is currently located. Then, in step ST16, messages "GetDlgItem (hWnd, ID_EXPR)" and "GetDlgItem (hWnd, ID_RDNG)" are generated and are sent to the Japanese-language word registration program 25 to receive the handles of the first and second edit controls 51 and 52. In addition, in step ST16, it is determined whether or not the above handle of the "control" at which the input focus is currently located, coincides with one of the above handles of the first and second edit controls 51 and 52. When it is determined in step ST16 that the above handle of the "control" at which the input focus is currently located, does not coincide with one of the above handles of the first and second edit controls 51 and 52, the operation goes to step ST23, and the operation is returned to the Japanese-language word registration program 25. In the Japanese-language word registration program 25, the conventional processing in response to the key input is carried out. Then, the operation goes back to step ST11 of the word registration support program 26. When it is determined that the above handle of the "control" at which the input focus is currently located, coincides with one of the above handles of the first and second edit controls 51 and 52, the operation goes to step ST17, and a message "GetKeyState (VK_CONTROL)" is generated and is sent to the Japanese-language word registration program 25 to receive a sequence of bits which indicates a current state of the key inputs. The most significant bit of the sequence of bits is equal to "1", this bit indicates the control (Ctrl) key is being pressed, and when the most significant bit is equal to "0", this bit indicates the control (Ctrl) key is not being pressed. As explained with reference to FIG. 7, when the control (Ctrl) key is not being pressed, the word registration support program 26 recognizes that the above key input of the Down or Up key is made for changing the selection in the first list box 53, and when the control (Ctrl) key is being pressed, the word registration support program 26 recognizes that the above key input of the Down or Up key is made for changing the selection in the second list box 54. When it is determined in step ST17 that the control (Ctrl) key is being pressed, the operation goes to step ST18, a variable "uld" is set to "ID_PSKIND", and the operation goes to step ST12. When it is determined in step ST17 that the control (Ctrl) key is not being pressed, the operation goes to step ST19, the variable "uld" is set to "ID_PS", and the operation goes to step ST20 in FIG. 8B.

Referring to FIG. 8B, in step ST20, a message "SendDlgItemMessage (hWnd, uld, LB_GETCURSEL, 0, 0)1" is generated and is sent to the Japanese-language word registration program 25 to receive information concerning which item is currently selected in the above one of the first and second list boxes which the above variable "uld" indicates. In this example, the item is indicated by the row number counted from the top in the column of items in each list box. Then, the word registration support program 26 receives from the Japanese-language word registration program 25 a number which indicates the item currently selected, and a variable "uIdx" is set to the number. In step ST21, when the message received in step ST11 contains the code "VK_DOWN", the variable "uIdx" is incremented by one. When the message received in step ST11 contains the code "VK_UP", the variable "uIdx" is decremented by one. Next, in step ST22, a message "SendDlgItemMessage (hWnd, uld, LB_SETCURSEL, uIdx, 0)" is generated and is sent to the Japanese-language word registration program 25 to set the new selection corresponding to the above incremented or decremented variable "uIdx" in the Japanese-language word registration program 25. Then, the operation goes to step ST11.

Generally, in the Japanese-language word registration program 25, some function may be defined in response to the key input by the Up or Down key. For example, the pressing of the Up key may be defined corresponding to the operation of moving the caret to the left end of the window of the edit control, and the Down key may be defined corresponding to the operation of moving the caret to the right end of the window of the edit control. However, since these definitions can be considered to be dispensable because these operations can be replaced with the successive pressing of the Left or Right key, respectively. In such a case, the word registration support program 26 may further have a function to instruct the Japanese-language word registration program 25 to suppress the function of the Japanese-language word registration program 25 which is defined to be performed in response to the key input by the Up key or the Down key while the input focus is located in the first or second edit control 51 or 52.

Further, the above word registration support program 26 may further have a function of allowing an input of a character in the second edit control 52 when a character key is pressed while the input focus is located at the first or second list box 53 or 54. The process flow for this function is not shown since it is apparent that the process flow for this function is similar to FIGS. 7, 8A, and 8B.

Since the above process is in accordance with the first to third aspect of the present invention (in particular, with the second aspect of the present invention), the input focus is not changed by the word registration support program 26 as in the above process. However, in step ST6 and ST7 in FIG. 7 or ST22 of FIG. 8B, it is possible to change the input focus to the list box in addition to the change of the selection in the list box. When the input focus is changed like this, the process is in accordance with the tenth to twelfth aspects of the present invention (in particular, with the eleventh aspect of the present invention).

In the above process, there are two list boxes in which the use of the Up and Down keys are defined. Therefore, the control key is used for designating one of the two list boxes in accordance with the second aspect of the present invention. When there are more than two list boxes, a specific key operation may be defined for designating each list box in accordance with the third aspect of the present invention. When there is only one input area (list box) for which at least one key input (including a combination of simultaneous or successive more than one key inputs) is defined, and the at least one key input is not defined for another input area at which the input focus is located, no key operation such as the control (Ctrl) key in the above embodiment is necessary, and the process is in accordance with the first aspect of the present invention. An example to which the first aspect of the present invention is applied is explained below with reference to FIG. 10.

Another Example

FIG. 10 is a diagram illustrating a dialog box which is displayed on the display screen by a symbol input program. The symbol input program is executed when an operator of a word processor (a computer which is programmed with a word processing program) inputs a command to call a function of inputting one of the symbols which are provided in the word processing program, and the dialog box of FIG. 10 is displayed in response to the command.

The dialog box of FIG. 10 contains two input areas. The first input area 71 contains a group of option buttons which indicates a plurality of options for the type of symbol which the operator wishes to input into a text during the word processing operation. In the second input area 72, a list box which indicates a plurality of items for the symbol to be selected. The Right and Left keys are defined for shifting to right or left the selection in the first input area 71, are not defined for the selection in the second input area 72, and the indication "← →" is provided for guidance. The Up and Down keys are defined for shifting upward or downward the selection in the second input area 72, are not defined for the selection in the first input area 71, and the indication "↑↓" is provided for guidance. In the first input area 71, when a right key is pressed while the option located at the right end on a first line is selected, the selection is shifted to the option at the left end on a second line located under the first line, and when a left key is pressed while the option located at the left end on a first line is selected, the selection is shifted to the option at the right end on a second line located above the first line.

By using a program similar to the embodiment relating to the word registration program, when the Up key or the Down key is pressed while the input focus is located at the first input area 71, the key input by the Up key or the Down key is recognized as a command for shifting upward or downward the selection of the item in the list box in the second input area 72. Similarly, when the Right key or the Left key is pressed while the input focus is located at the second input area 72, the key input by the Right key or the Left key is recognized as a command for shifting to right or left the selection of one of the option buttons in the first input area 71.

Other Variations

Although in the above embodiment and the example, a key input, when an input focus is located at a first input area, may be recognized as an input of information through a second input area, and the second input area is contained in the same dialog box as the first input area. However, it is not necessary for the second input area to be located in the same dialog box as the first input area. The exceptional input control according to the present invention may be performed between any two input areas respectively contained in different windows as long as the two windows are open on the display screen at the same time. In this case, the window containing the second input area may be hidden behind any other window or windows as long as the two windows containing the first and second input areas are open on the display screen at the same time. Further, the second input area may not be contained in a window, i.e., may be located outside any window (such as the "Desktop area" in the Macintosh system) as long as the second input area is displayed on the display screen. In this case, the second input area may be hidden behind any other window or windows as long as the second input area is to appear when the window or windows hiding the second input areas are closed.

Each step of the above process may be realized by a hardware logic circuit or a computer which is so programmed. Therefore, the apparatus according to the fourth, fifth, sixth, thirteenth, fourteenth, or fifteenth aspects of the present invention, which execute the process according to the first, second, third, tenth, eleventh, or twelfth aspects of the present invention, respectively, can be constructed with hardware logic circuitry, a programed computer, or a combination of hardware logic circuitry and the programed computer.

When a program which instructs a computer to execute the process according to the first, second, third, tenth, eleventh, or twelfth aspects of the present invention, is installed in a computer system such as indicated in FIG. 3, the computer system realizes the apparatus according to the fourth, fifth, sixth, thirteenth, fourteenth, or fifteenth aspects of the present invention, respectively.

When the above program which instructs a computer to execute the process according to the first, second, third, tenth, eleventh, or twelfth aspects of the present invention, is stored in a storage medium such as a floppy disc and a CD-ROM, the storage medium realizes the computer-readable storage medium according to the seventh, eighth, ninth, sixteenth, seventeenth, or eighteenth aspects of the present invention, respectively.

I claim:

1. A process for allowing, while an input focus is located in a first input area on a display screen, an input of information through a second input area on the display screen, said process comprising the steps of:

(a) determining, while the input focus is located in said first input area, whether or not there is a key input from a keyboard, where said key input is predefined for inputting information through said second input area, and is not predefined for inputting information through said first input area; and (b) inputting, while maintaining the location of said input focus in said first input area, said information designated by said key input, through said second input area, without inputting the information through said first input area, when it is determined in step (a) that there is said key input.

2. A process according to claim 1, wherein said key input can include simultaneous pressing of more than one key on the keyboard.

3. A process for allowing, while an input focus is located in a first input area on a display screen, an input of information through one of second and third input areas on the display screen, said process comprising the steps of:

(a) determining, while the input focus is located in said first input area, whether or not there is a first key input from a keyboard, where said first key input is predefined for inputting information through either of said second and third input areas, and is not predefined for inputting information through said first input area;

(b) determining whether or not there is a second key input which is predefined to designate said second input area;

(c) inputting, while maintaining the location of said input focus in said first input area, said information designated by said first key input, through said second input area, without inputting the information through said first input area, when it is determined in steps (a) and (b) that there are said first and second key inputs, respectively; and (d) inputting, while maintaining the location of said input focus in said first input area, said information designated by said first key input, through said third input area, without inputting the information through said first input area, when it is determined in step (a) that there is said first key input and it is determined in step (b) that there is no said second key input.

4. A process according to claim 3, wherein each of said first and second key inputs can include simultaneous pressing of more than one key on the keyboard.

5. A process for allowing, while an input focus is located in a first input area on a display screen, an input of information through one of a plurality of second input areas on the display screen, said process comprising the steps of:

(a) determining, while the input focus is located in said first input area, whether or not there is a first key input from a keyboard, where said first key input is predefined for inputting information through either of said plurality of second input areas, and is not predefined for inputting information through said first input area;

(b) receiving one of a plurality of predefined second key inputs designating said plurality of second input areas, respectively, and determining one of said plurality of second input areas which said one of said plurality of second key inputs designates; and (c) inputting, while maintaining the location of said input focus in said first input area, said information designated by said first key input, through said one of said plurality of second input areas which is determined in step (b), without inputting the information through said first input area, when it is determined in step (a) that there is said first key input, and said one of said plurality of second input areas which said one of the plurality of predefined second key inputs designates is determined in step (b).

6. A process according to claim 5, wherein each of said first and second key inputs can include simultaneous pressing of more than one key on the keyboard.

7. A control apparatus for allowing, while an input focus is located in a first input area on a display screen, an input of information through a second input area on the display screen, said control apparatus comprising:

a determining unit determining, while the input focus is located in said first input area, whether or not there is a key input from a keyboard, where said key input is predefined for inputting information through said second input area, and is not predefined for inputting information through said first input area; and an input control unit inputting, while maintaining the location of said input focus in said first input area, said information designated by said key input, through said second input area, without inputting the information through said first input area, when it is determined by the determining unit that there is said key input.

8. A control apparatus according to claim 7, further comprising a guidance unit indicating, on the display screen, which key input is predefined for inputting the information through said second input area, and is not predefined for inputting information through said first input area.

9. A control apparatus according to claim 7, wherein said key input can include simultaneous pressing of more than one key on the keyboard.

10. A control apparatus for allowing, while an input focus is located in a first input area on a display screen, an input of information through one of second and third input areas on the display screen, said control apparatus comprising:

a first determining unit determining, while the input focus is located in said first input area, whether or not there is a first key input from a keyboard, where said first key input is predefined for inputting information through either of said second and third input areas, and is not predefined for inputting information through said first input area;

a second determining unit determining whether or not there is a second key input which is predefined to designate said second input area;

a first input control unit inputting, while maintaining the location of said input focus in said first input area, said information designated by said first key input, through said second input area, without inputting the information through said first input area, when it is determined by the first and second determining units that there are said first and second key inputs, respectively; and a second input control unit inputting, while maintaining the location of said input focus in said first input area, said information designated by said first key input, through said third input area, without inputting the information through said first input area, when it is determined by the first determining unit that there is said first key input, and it is determined by the second determining unit that there is no said second key input.

11. A control apparatus according to claim 10, further comprising a guidance unit indicating, on the display screen, which key input is predefined for inputting the information through said second input area, and is not predefined for inputting information through said first input area.

12. A control apparatus according to claim 10, further comprising a guidance unit indicating, on the display screen, which key input is predefined as said second key input.

13. A control apparatus according to claim 10, wherein each of said first and second key inputs can include simultaneous pressing of more than one key on the keyboard.

14. A control apparatus for allowing, while an input focus is located in a first input area on a display screen, an input of information through one of a plurality of second input areas on the display screen, said control apparatus comprising:
   a first determining unit determining, while the input focus is located in said first input area, whether or not there is a first key input from a keyboard, where said first key input is predefined for inputting information through either of said plurality of second input areas, and is not predefined for inputting information through said first input area;
   a second determining unit receiving one of a plurality of predefined second key inputs designating said plurality of second input areas, respectively, and determining one of said plurality of second input areas which said one of said plurality of second key inputs designates;
   an input control unit inputting, while maintaining the location of said input focus in said first input area, said information designated by said first key input, through said one of said plurality of second input areas which is determined by the second determining unit, without inputting the information through said first input area, when it is determined by the first determining unit that there is said first key input, and said one of said plurality of second input areas which said one of the plurality of predefined second key inputs designates is determined by the second determining unit.

15. A control apparatus according to claim 14, further comprising a guidance unit indicating, on the display screen, which key input is predefined for inputting the information through said second input area, and is not predefined for inputting information through said first input area.

16. A control apparatus according to claim 14, further comprising a guidance unit indicating, on the display screen, which key inputs are respectively predefined as said plurality of predefined second key inputs.

17. A control apparatus according to claim 14, wherein each of said first and second key inputs can include simultaneous pressing of more than one key on the keyboard.

18. A computer-readable storage medium in which a program is stored, where said program, when used with a computer, directs the computer to execute a process for allowing, while an input focus is located in a first input area on a display screen, an input of information through a second input area on the display screen, said process comprising the steps of:
   (a) determining, while the input focus is located in said first input area, whether or not there is a key input from a keyboard, where said key input is predefined for inputting information through said second input area, and is not predefined for inputting information through said first input area; and
   (b) inputting, while maintaining the location of said input focus in said first input area, said information designated by said key input, through said second input area, without inputting the information through said first input area, when it is determined in step (a) that there is said key input.

19. A computer-readable storage medium according to claim 18, wherein said key input can include simultaneous pressing of more than one key on the keyboard.

20. A computer-readable storage medium in which a program is stored, where said program, when used with a computer, directs the computer to execute a process for allowing, while an input focus is located in a first input area on a display screen, an input of information through one of second and third input areas on the display screen, said process comprising the steps of:
   (a) determining, while the input focus is located in said first input area, whether or not there is a first key input from a keyboard, where said first key input is predefined for inputting information through either of said second and third input areas, and is not predefined for inputting information through said first input area;
   (b) determining whether or not there is a second key input which is predefined to designate said second input area;
   (c) inputting, while maintaining the location of said input focus in said first input area, said information designated by said first key input, through said second input area, without inputting the information through said first input area, when it is determined in steps (a) and (b) that there are said first and second key inputs, respectively; and
   (d) inputting, while maintaining the location of said input focus in said first input area, said information designated by said first key input, through said third input area, without inputting the information through said first input area, when it is determined in step (a) that there is said first key input and it is determined in step (b) that there is no said second key input.

21. A computer-readable storage medium according to claim 20, wherein each of said first and second key inputs can include simultaneous pressing of more than one key on the keyboard.

22. A computer-readable storage medium in which a program is stored, where said program, when used with a computer, directs the computer to execute a process for allowing, while an input focus is located in a first input area on a display screen, an input of information through one of a plurality of second input areas on the display screen, said process comprising the steps of:
   (a) determining, while the input focus is located in said first input area, whether or not there is a first key input from a keyboard, where said first key input is predefined for inputting information through any of said plurality of second input areas, and is not predefined for inputting information through said first input area;
   (b) receiving one of a plurality of predefined second key inputs designating said plurality of second input areas, respectively, and determining one of said plurality of second input areas which said one of said plurality of second key inputs designates; and
   (c) inputting, while maintaining the location of said input focus in said first input area, said information designated by said first key input, through said one of said plurality of second input areas which is determined in step (b), without inputting the information through said first input area, when it is determined that there is said first key input in step (a), and said one of said plurality of second input areas which said second key input designates is determined in step (b).

23. A computer-readable storage medium according to claim 22, wherein each of said first and second key inputs can include simultaneous pressing of more than one key on the keyboard.

24. A process for changing a location of an input focus from a first input area on a display screen to a second input area on the display screen, said process comprising the steps of:
(a) determining, while the input focus is located in said first input area, whether or not there is a key input from a keyboard, where said key input is predefined for inputting information through said second input area, and is not predefined for inputting information through said first input area;
(b) inputting said information designated by said key input, through said second input area, without inputting the information through said first input area, when it is determined in step (a) that there is said key input; and
(c) changing the location of the input focus from said first input area to said second input area when it is determined in step (a) that there is said key input.

25. A process for changing a location of an input focus from a first input area on a display screen to one of second and third input areas on the display screen, said process comprising the steps of:
(a) determining, while the input focus is located in said first input area, whether or not there is a first key input from a keyboard, where said first key input is predefined for inputting information through either of said second and third input areas, and is not predefined for inputting information through said first input area;
(b) determining whether or not there is a second key input which is predefined to designate said second input area;
(c) inputting said information designated by said first key input, through said second input area, without inputting the information through said first input area, when it is determined in steps (a) and (b) that there are said first and second key inputs, respectively;
(d) inputting said information designated by said first key input, through said third input area, without inputting the information through said first input area, when it is determined in step (a) that there is said first key input and it is determined in step (b) that there is no said second key input;
(e) changing the location of the input focus from said first input area to said second input area when it is determined in steps (a) and (b) that there are said first and second key inputs, respectively; and
(f) changing the location of the input focus from said first input area to said third input area when it is determined in step (a) that there is said first key input, and it is determined in step (b) that there is no said second key input.

26. A process for changing a location of an input focus from a first input area on a display screen to one of a plurality of second input areas on the display screen, said process comprising the steps of:
(a) determining, while the input focus is located in said first input area, whether or not there is a first key input from a keyboard, where said first key input is predefined for inputting information through any of said plurality of second input areas, and is not predefined for inputting information through said first input area;
(b) receiving one of a plurality of predefined second key inputs designating said plurality of second input areas, respectively, and determining one of said plurality of second input areas which said one of said plurality of second key inputs designates;
(c) inputting said information designated by said first key input, through said one of said plurality of second input areas which is determined in step (b), without inputting the information through said first input area, when it is determined in step (a) that there is said first key input, and said one of said plurality of second input areas which said one of a plurality of predefined second key inputs designates is determined in step (b); and
(d) changing the location of the input focus from said first input area to said one of said plurality of second input areas which is determined in step (b) when it is determined in step (a) that there is said first key input, and said one of said plurality of second input areas which said one of the plurality of second key inputs designates is determined in step (b).

27. A control apparatus for changing a location of an input focus from a first input area on a display screen to a second input area on the display screen, said control apparatus comprising:
a determining unit determining, while the input focus is located in said first input area, whether or not there is a key input from a keyboard, where said key input is predefined for inputting information through said second input area, and is not predefined for inputting information through said first input area;
an input control unit inputting said information designated by said key input, through said second input area, without inputting the information through said first input area, when it is determined by the determining means that there is said key input; and
a changing unit changing the location of the input focus from said first input area to said second input area when it is determined by the determining unit that there is said key input.

28. A control apparatus for changing a location of an input focus from a first input area on a display screen to one of second and third input areas on the display screen, said control apparatus comprising:
a first determining unit determining, while the input focus is located in said first input area, whether or not there is a first key input from a keyboard, where said first key input is predefined for inputting information through either of said second and third input areas, and is not predefined for inputting information through said first input area;
a second determining unit determining whether or not there is a second key input which is predefined to designate said second input area;
a first input control unit inputting said information designated by said first key input, through said second input area, without inputting the information through said first input area, when it is determined by the first and second determining units that there are said first and second key inputs, respectively;
a second input control unit inputting said information designated by said first key input, through said third input area, without inputting the information through said first input area, when it is determined by the first determining unit that there is said first key input, and it is determined by the second determining unit that there is no said second key input;
a first changing unit changing the location of the input focus from said first input area to said second input area when it is determined by the first and second determining units that there are said first and second key inputs, respectively; and a second changing unit changing the location of the input focus from said first input area to said third input area when it is determined by the first determining unit that there is said first key input, and it is determined by the second determining unit that there is no second key input.

29. A control apparatus for changing a location of an input focus from a first input area on a display screen to one of a plurality of second input areas on the display screen, said control apparatus comprising:

a first determining unit determining, while the input focus is located in said first input area, whether or not there is a first key input from a keyboard, where said first key input is predefined for inputting information through either of said plurality of second input areas, and is not predefined for inputting information through said first input area;

a second determining unit receiving one of a plurality of predefined second key inputs designating said plurality of second input areas, respectively, and determining one of said plurality of second input areas which said one of said plurality of second key inputs designates;

an input control unit inputting said information designated by said first key input, through said one of said plurality of second input areas which is determined by the second determining unit, without inputting the information through said first input area, when it is determined by the first determining unit that there is said first key input, and said one of said plurality of second input areas which said one of a plurality of predefined second key inputs designates is determined by the second determining unit; and a changing unit changing the location of the input focus from said first input area to said one of said plurality of second input areas which is determined by the second determining unit when it is determined by the first determining unit that there is said first key input, and said one of said plurality of second input areas which said one of the plurality of second key inputs designates is determined by the second determining unit.

30. A computer-readable storage medium in which a program is stored, where said program, when used with a computer, directs the computer to execute a process for changing a location of an input focus from a first input area on a display screen to a second input area on the display screen, said process comprising the steps of:

(a) determining, while the input focus is located in said first input area, whether or not there is a key input from a keyboard, where said key input is predefined for inputting information through said second input area, and is not predefined for inputting information through said first input area;

(b) inputting said information designated by said key input, through said second input area, without inputting the information through said first input area, when it is determined in step (a) that there is said key input; and (c) changing the location of the input focus from said first input area to said second input area when it is determined in step (a) that there is said key input.

31. A computer-readable storage medium in which a program is stored, where said program, when used with a computer, directs the computer to execute a process for changing a location of an input focus from a first input area on a display screen to one of second and third input areas on the display screen, said process comprising the steps of:

(a) determining, while the input focus is located in said first input area, whether or not there is a first key input from a keyboard, where said first key input is predefined for inputting information through either of said second and third input areas, and is not predefined for inputting information through said first input area;

(b) determining whether or not there is a second key input which is predefined to designate said second input area;

(c) inputting said information designated by said first key input, through said second input area, without inputting the information through said first input area, when it is determined in steps (a) and (b) that there are said first and second key inputs, respectively;

(d) inputting said information designated by said first key input, through said third input area, without inputting the information through said first input area, when it is determined in step (a) that there is said first key input and it is determined in step (b) that there is no said second key input;

(e) changing the location of the input focus from said first input area to said second input area when it is determined in steps (a) and (b) that there are said first and second key inputs, respectively; and (f) changing the location of the input focus from said first input area to said third input area when it is determined in step (a) that there is said first key input, and it is determined in step (b) that there is no said second key input.

32. A computer-readable storage medium in which a program is stored, where said program, when used with a computer, directs the computer to execute a process for changing a location of an input focus from a first input area on a display screen to one of a plurality of second input areas on the display screen, said process comprising the steps of:

(a) determining, while the input focus is located in said first input area, whether or not there is a first key input from a keyboard, where said first key input is predefined for inputting information through either of said plurality of second input areas, and is not predefined for inputting information through said first input area;

(b) receiving one of a plurality of predefined second key inputs designating said plurality of second input areas, respectively, and determining one of said plurality of second input areas which said one of said plurality of second key inputs designates;

(c) inputting said information designated by said first key input, through said one of said plurality of second input areas which is determined in step (b), without inputting the information through said first input area, when it is determined that there is said first key input in step (a), and said one of said plurality of second input areas which said second key input designates is determined in step (b); and (d) changing the location of the input focus from said first input area to said one of said plurality of second input areas which is determined in step (b) when it is determined that there is said first key input in step (a), and said one of said plurality of second input areas which said one of the plurality of predefined second key inputs designates is determined in step (b).

33. A process for controlling input of information to a display screen under the control of a computer, comprising:

determining, while an input focus is located at a first input area, whether or not a predetermined keyboard input occurs for inputting information to a second input area; and inputting information to the second input area, without inputting the information to the first input area, when it is determined that the predetermined keyboard input has occurred.

34. A process for inputting information through a graphic user interface which provides a text input area and an option selection area having a plurality of options to be selected, said process comprising:

(a) receiving a key input which designates information to be input or an operation of changing a selection in said option selection area;

(b) determining whether said key input is an input of one of cursor keys, or an input of one of character keys; and (c) inputting said information designated by said key input through said text input area when it is determined in step (b) that said key input is an input of one of the character keys; and (d) changing the selection in said option selection area as designated by said key input when it is determined in step (b) that said key input is an input of one of cursor keys, without changing the information in said text input area.

35. A computer-readable storage medium in which a program is stored, where said program, when used with a computer, directs the computer to execute a process for allowing, while an input focus is located in a first input area on a display screen, an input of information through a second input area on the display screen, said process comprising:

(a) receiving a key input which designates information to be input or an operation of changing a selection in said option selection area;

(b) determining whether said key input is an input of one of cursor keys, or an input of one of character keys; and (c) inputting said information designated by said key input through said text input area when it is determined in step (b) that said key input is an input of one of the character keys; and (d) changing the selection in said option selection area as designated by said key input when it is determined in step (b) that said key input is an input of one of cursor keys, without changing the information in said text input area.

36. A control apparatus for controlling input of information through a graphic user interface which provides a text input area and an option selection area having a plurality of options to be selected, said control apparatus comprising:

a receive unit receiving a key input which designates information to be input or an operation of changing a selection in said option selection area;

a determine unit determining whether said key input is an input of one of a plurality of cursor keys, or an input of one of a plurality of character keys;

an input control unit inputting said information designated by said key input through said text input area when it is determined by said determine unit that said key input is an input of one of the character keys; and a change unit changing the selection in said option selection area as designated by said key input, without changing the information in said text area, when it is determined by said determine unit that said key input is an input of one of the cursor keys.

37. A computer readable storage medium including a process controlling a computer of controlling input of information to a display screen, comprising:

determining, while an input focus is located at a first input area, whether or not a predetermined keyboard input occurs for inputting information to a second input area; and inputting information to the second input area, without inputting the information to the first input area, when it is determined that the predetermined keyboard input has occurred.

38. A control apparatus controlling input of information to a display screen, comprising:

means for determining, while an input focus is located at a first input area, whether or not a predetermined keyboard input occurs for inputting information to a second input area; and means for inputting information to the second input area, without inputting the information to the first input area, when it is determined that the predetermined keyboard input has occurred.

* * * * *

UNITED STATES PATENT AND TRADEMARK OFFICE
CERTIFICATE OF CORRECTION

PATENT NO.: 6,002,862
DATED : December 14, 1999
INVENTOR(S): Shinichi TAKAIKE

It is certified that error appears in the above-identified patent and that said Letters Patent is hereby corrected as shown below:

On the title page, [75] Inventor, change "Inagi" to --Tokyo--.

On the title page, [73] Assignee, change "Kanagawa" to --Kawasaki--.

Signed and Sealed this

Fifteenth Day of August, 2000

*Attest:*

Q. TODD DICKINSON

*Attesting Officer*   *Director of Patents and Trademarks*